US009018286B2

(12) United States Patent
Daga et al.

(10) Patent No.: US 9,018,286 B2
(45) Date of Patent: *Apr. 28, 2015

(54) FLAME RETARDANT POLYCARBONATE COMPOSITIONS, METHODS OF MANUFACTURE THEREOF AND ARTICLES COMPRISING THE SAME

(71) Applicant: SABIC Innovative Plastics IP B.V., Bergen op Zoom (NL)

(72) Inventors: Vikram Daga, Evansville, IN (US); Amit Kulkarni, Evansville, IN (US); Wei Zhao, Mount Vernon, IN (US)

(73) Assignee: Sabic Global Technologies B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/901,368

(22) Filed: May 23, 2013

(65) Prior Publication Data
US 2013/0317143 A1    Nov. 28, 2013

Related U.S. Application Data

(60) Provisional application No. 61/651,487, filed on May 24, 2012, provisional application No. 61/651,481, filed on May 24, 2012.

(51) Int. Cl.
| | | |
|---|---|---|
| *C08K 5/5399* | (2006.01) | |
| *C09K 21/14* | (2006.01) | |
| *C08L 69/00* | (2006.01) | |
| *C08K 3/22* | (2006.01) | |
| *C08K 7/02* | (2006.01) | |
| *C08K 7/14* | (2006.01) | |
| *C08L 67/02* | (2006.01) | |
| *C08L 83/10* | (2006.01) | |
| *C08G 77/448* | (2006.01) | |

(52) U.S. Cl.
CPC .............. *C09K 21/14* (2013.01); *C08L 69/005* (2013.01); *C08L 69/00* (2013.01); *C08K 5/5399* (2013.01); *C08K 3/22* (2013.01); *C08K 7/02* (2013.01); *C08K 7/14* (2013.01); *C08L 67/02* (2013.01); *C08L 83/10* (2013.01); *C08L 2205/02* (2013.01); *C08G 77/448* (2013.01)

(58) Field of Classification Search
USPC ........................................................ 524/138
See application file for complete search history.

(56) References Cited

U.S. PATENT DOCUMENTS

| | | |
|---|---|---|
| 3,792,117 A | 2/1974 | Kolodchin et al. |
| 3,859,249 A | 1/1975 | McNeely |
| 3,865,783 A | 2/1975 | Clutter |
| 4,042,561 A | 8/1977 | DeEdwardo et al. |
| 4,111,883 A | 9/1978 | Mark |
| 4,117,041 A | 9/1978 | Guschl |
| 5,174,923 A | 12/1992 | Chen et al. |
| 5,856,380 A | 1/1999 | Bauer et al. |
| 5,965,627 A | 10/1999 | Allcock et al. |
| 6,072,011 A | 6/2000 | Hoover |
| 6,403,755 B1 | 6/2002 | Stewart et al. |
| 6,433,082 B1 | 8/2002 | Eckel et al. |
| 6,528,559 B1 | 3/2003 | Nakacho et al. |
| 6,562,887 B1 | 5/2003 | Kurasawa et al. |
| 6,596,893 B2 | 7/2003 | Nakacho et al. |
| 6,630,524 B1 | 10/2003 | Lim et al. |
| 6,632,891 B1 | 10/2003 | Tada et al. |
| 6,723,864 B2 | 4/2004 | Silva et al. |
| 6,727,312 B1 | 4/2004 | Nodera |
| 6,737,453 B2 | 5/2004 | Sumimoto et al. |
| 6,747,078 B1 | 6/2004 | Eckel et al. |
| 6,790,886 B2 | 9/2004 | Harashina et al. |
| 6,790,887 B1 | 9/2004 | Nishihara |
| 6,894,142 B2 | 5/2005 | Heuer et al. |
| 6,946,578 B2 | 9/2005 | Nakano et al. |
| 6,949,596 B2 | 9/2005 | Seidel et al. |
| 6,969,745 B1 | 11/2005 | Taraiya et al. |
| 7,094,819 B2 | 8/2006 | Kakegawa et al. |
| 7,169,534 B2 | 1/2007 | Baumann et al. |

(Continued)

FOREIGN PATENT DOCUMENTS

| | | |
|---|---|---|
| CA | 2335948 A1 | 1/2000 |
| CN | 101142089 A | 3/2008 |

(Continued)

OTHER PUBLICATIONS

JP2012-001580,A Computer Translation. Aromatic Polycarbonate Resin Composition and Molding Publication Date Jan. 5, 2012 (20 pages).
JP2012-111925 Patent Abstracts of Japan—14.06.2012 (1 page; Abstract only).
Invitation to Pay Additional Fees for International Application No. PCT/IB2013/054306; International filing date May 24, 2013; Issued Oct. 18, 2013 (8 pages).
Invitation to Pay Additional Fees for International Application No. PCT/IB2013/054315; International filing date May 24, 2013; Issued Oct. 9, 2013 (6 pages).

(Continued)

*Primary Examiner* — Robert Loewe
(74) *Attorney, Agent, or Firm* — Cantor Colburn LLP

(57) ABSTRACT

Disclosed herein is a flame retardant composition comprising 20 to 80 weight percent of a polycarbonate composition; where the polycarbonate composition comprises a polysiloxane-carbonate copolymer; an impact modifier in an amount of 0.5 to 25 weight percent; and 1 to 20 weight percent of a phosphazene compound; where all weight percents are based on the total weight of the flame retardant composition. Disclosed herein too is a method comprising blending 20 to 80 weight percent of a polycarbonate composition; where the polycarbonate composition comprises a polysiloxane-carbonate copolymer; an impact modifier in an amount of 0.5 to 25 weight percent; and 1 to 20 weight percent of a phosphazene compound to produce a flame retardant composition; where all weight percents are based on the total weight of the flame retardant composition; and extruding and molding the flame retardant composition.

22 Claims, No Drawings

(56) References Cited

U.S. PATENT DOCUMENTS

| | | | |
|---|---|---|---|
| 7,169,836 B2 | 1/2007 | Harashina et al. | |
| 7,247,666 B2 | 7/2007 | Urabe et al. | |
| 7,317,046 B2 | 1/2008 | Fukuoka et al. | |
| 7,341,783 B2 | 3/2008 | Tokiwa | |
| 7,365,815 B2 | 4/2008 | Hino et al. | |
| 7,462,662 B2 | 12/2008 | Balfour et al. | |
| 7,468,408 B2 | 12/2008 | Onishi et al. | |
| 7,531,664 B2 | 5/2009 | Troutman et al. | |
| 7,659,332 B2 | 2/2010 | Kang et al. | |
| 7,691,924 B2 | 4/2010 | Lim et al. | |
| 7,695,815 B2 | 4/2010 | Agarwal et al. | |
| 7,759,418 B2 | 7/2010 | Murakami et al. | |
| 7,767,736 B2 | 8/2010 | Baran, Jr. | |
| 7,799,855 B2 | 9/2010 | Ebeling et al. | |
| 7,863,382 B2 | 1/2011 | Ishii et al. | |
| 7,915,441 B2 | 3/2011 | Fushimi | |
| 7,985,788 B2 | 7/2011 | Shinagawa et al. | |
| 8,039,132 B2 | 10/2011 | Shimizu et al. | |
| 8,053,500 B2 | 11/2011 | Morimoto et al. | |
| 8,058,333 B1 | 11/2011 | Chang et al. | |
| 8,063,245 B2 | 11/2011 | Okada et al. | |
| 8,399,546 B2 | 3/2013 | Li et al. | |
| 2002/0193027 A1 | 12/2002 | Dana et al. | |
| 2003/0083442 A1 | 5/2003 | Nishihara et al. | |
| 2003/0109612 A1 | 6/2003 | Seidel et al. | |
| 2004/0039145 A1 | 2/2004 | Silva et al. | |
| 2005/0182165 A1 | 8/2005 | Ma et al. | |
| 2005/0228087 A1 | 10/2005 | Murakami et al. | |
| 2005/0245670 A1 | 11/2005 | Sato | |
| 2005/0261396 A1 | 11/2005 | Ermi et al. | |
| 2006/0079612 A1 | 4/2006 | Troutman et al. | |
| 2006/0223913 A1 | 10/2006 | Osada | |
| 2006/0276582 A1 | 12/2006 | Mochizuki et al. | |
| 2006/0293414 A1 | 12/2006 | Gorny et al. | |
| 2007/0040154 A1 | 2/2007 | Murakami | |
| 2007/0149661 A1 | 6/2007 | Charati et al. | |
| 2007/0155873 A1 | 7/2007 | Kang et al. | |
| 2007/0191518 A1 | 8/2007 | Chen et al. | |
| 2008/0015289 A1 | 1/2008 | Siripurapu | |
| 2008/0188597 A1 | 8/2008 | Moriyama et al. | |
| 2009/0023351 A1 | 1/2009 | Kashihara et al. | |
| 2009/0292048 A1 | 11/2009 | Li et al. | |
| 2010/0036054 A1 | 2/2010 | Hutchings et al. | |
| 2010/0129649 A1 | 5/2010 | Malinoski et al. | |
| 2010/0139944 A1 | 6/2010 | Guo et al. | |
| 2010/0152344 A1 | 6/2010 | van den Bogerd et al. | |
| 2010/0168293 A1 | 7/2010 | Sawant et al. | |
| 2010/0222244 A1 | 9/2010 | Maccone et al. | |
| 2010/0233486 A1 | 9/2010 | Inoue et al. | |
| 2010/0261818 A1 | 10/2010 | Seki | |
| 2011/0086225 A1 | 4/2011 | Takagi et al. | |
| 2011/0118395 A1 | 5/2011 | Kiuchi et al. | |
| 2011/0130497 A1 | 6/2011 | Su et al. | |
| 2011/0136979 A1 | 6/2011 | Cogen et al. | |
| 2011/0172423 A1 | 7/2011 | Fuchs et al. | |
| 2011/0218278 A1 | 9/2011 | Ikuno et al. | |
| 2011/0257296 A1 | 10/2011 | LaPointe et al. | |
| 2012/0021202 A1 | 1/2012 | Senda et al. | |
| 2012/0028047 A1 | 2/2012 | Imai et al. | |
| 2012/0252945 A1* | 10/2012 | Yamaguchi et al. | 524/141 |
| 2013/0131241 A1 | 5/2013 | van de Grampel et al. | |
| 2013/0137801 A1 | 5/2013 | Ha et al. | |
| 2013/0224462 A1* | 8/2013 | van der Mee et al. | 428/220 |
| 2013/0313419 A1 | 11/2013 | Nakazawa et al. | |

FOREIGN PATENT DOCUMENTS

| | | |
|---|---|---|
| CN | 1795238 B | 6/2010 |
| DE | 4433072 A1 | 3/1996 |
| DE | 10196566 B4 | 7/2008 |
| DE | 10393198 B4 | 6/2010 |
| DE | 10392639 | 9/2010 |
| DE | 10392639 B4 | 9/2010 |
| DE | 112004002030 | 12/2010 |
| DE | 112004002030 B4 | 12/2010 |
| EP | 00064752 A2 | 11/1982 |
| EP | 00064752 B1 | 11/1982 |
| EP | 214351 B1 | 3/1987 |
| EP | 0246620 A2 | 11/1987 |
| EP | 304296 B1 | 2/1989 |
| EP | 0376021 B1 | 7/1990 |
| EP | 0421747 A3 | 4/1991 |
| EP | 0421747 B1 | 4/1991 |
| EP | 528113 B1 | 2/1993 |
| EP | 0728811 A2 | 8/1996 |
| EP | 0728811 B1 | 8/1996 |
| EP | 562517 B1 | 8/1997 |
| EP | 806451 A1 | 11/1997 |
| EP | 0945478 A1 | 9/1999 |
| EP | 1069154 A1 | 1/2001 |
| EP | 1104766 A4 | 6/2001 |
| EP | 1548065 A1 | 6/2005 |
| EP | 1548065 B1 | 6/2005 |
| EP | 1603175 B1 | 11/2009 |
| EP | 1799766 B1 | 6/2010 |
| EP | 1799766 B8 | 6/2010 |
| EP | 1927151 B1 | 8/2011 |
| EP | 2390282 A1 | 11/2011 |
| GB | 1598819 A | 9/1981 |
| JP | 08081620 A | 3/1996 |
| JP | 2001002908 A | 1/2001 |
| JP | 2007045906 A | 2/2007 |
| JP | 2007070468 A | 3/2007 |
| JP | 2012001580 A | 1/2012 |
| JP | 2012111925 A | 6/2012 |
| KR | 10-0435571 B1 | 1/2003 |
| KR | 20030008811 | 1/2003 |
| KR | 20100070036 A | 6/2010 |
| WO | WO9910429 A1 | 3/1999 |
| WO | 03020827 A1 | 3/2003 |
| WO | 2004007611 | 1/2004 |
| WO | WO2005019231 A1 | 3/2005 |
| WO | WO2005073264 A1 | 8/2005 |
| WO | WO2006096033 A | 9/2006 |
| WO | 2009141799 A1 | 11/2009 |
| WO | WO2010144615 A | 2/2010 |
| WO | 2010028785 A1 | 3/2010 |
| WO | WO2010053167 A1 | 5/2010 |
| WO | WO2010087193 A1 | 8/2010 |
| WO | 2010101041 | 9/2010 |
| WO | WO2010144615 A2 | 2/2011 |
| WO | WO2011090211 A1 | 7/2011 |
| WO | WO2011090215 A1 | 7/2011 |
| WO | WO2011118102 A1 | 9/2011 |
| WO | WO2011122080 A1 | 10/2011 |
| WO | WO2011125906 A1 | 10/2011 |
| WO | WO2011136379 A | 11/2011 |
| WO | WO2011155119 | 12/2011 |
| WO | WO2011155119 A1 | 12/2011 |
| WO | 2012015109 A1 | 2/2012 |
| WO | 2012058821 A1 | 5/2012 |
| WO | WO2013100606 A1 | 7/2013 |
| WO | 2013115151 A1 | 8/2013 |

OTHER PUBLICATIONS

International Search Report for International Application No. PCT/IB2013/054316; International filing date May 24, 2013; Issued Oct. 4, 2013. (5 pages).

International Search Report for International Application No. PCT/IB2013/054322; International Filing Date May 24, 2013; Issued Sep. 20, 2013 (5 pgs).

International Search Report for International Application No. PCT/IB2013/054323, International Filing date May 24, 2013; Issued Oct. 17, 2013 (4 pages).

International Search Report for International Application No. PCT/IB2013/054310; International filing date May 24, 2013; Issued Sep. 16, 2013. (4 pages).

International Search Report for International Application No. PCT/IB2013/054315; International filing date May 24, 2013; Issued Nov. 20, 2013 (7 pages).

International Search Report for International Application No. PCT/IB2013/054324, International Filing date May 24, 2013; Issued Sep. 16, 2013 (4 pages).

(56) References Cited

OTHER PUBLICATIONS

International Search Report for International Application No. PCT/IB2013/054325, International Filing date May 24, 2013; Issued Sep. 20, 2013 (5 pages).
International Search Report for International Application No. PCT/US2013/042606, International Filing date May 24, 2013; Issued Sep. 9, 2013 (5 pages).
International Search Report for International Application No. PCT/US2013/042603, International Filing date May 24, 2013; Issued Sep. 11, 2013 (7 pages).
International Search Report for International Application No. PCT/US2013/042729; International Filing Date May 24, 2013; Issued Sep. 10, 2013 (5 pgs).
Machine Translation of CN101142089A. Mar. 12, 2008.
Written Opinion for International Application No. PCT/IB2013/042603; International filing date May 24, 2013; Issued Sep. 11, 2013. (7 pages).
Written Opinion for International Application No. PCT/IB2013/054310; International filing date May 24, 2013; Issued Sep. 16, 2013. (4 pages).
Written Opinion for International Application No. PCT/IB2013/054315; International filing date May 24, 2013; Issued Nov. 20, 2013 (7 pages).
Written Opinion for International Application No. PCT/IB2013/054316; International filing date May 24, 2013; Issued Oct. 4, 2013. (5 pages).
Written Opinion for International Application No. PCT/IB2013/054322; International filling date May 24, 2013; Issued Sep. 20, 2013; (5 pages).
Written Opinion for Intenational Application No. PCT/IB2013/054323; International filling date May 24, 2013; Issued Oct. 17, 2013. (3 pages).
Written Opinion for International Application No. PCT/IB2013/054324; International filing date May 24, 2013; Issued Sep. 19, 2013. (5 pages).
Written Opinion for International Application No. PCT/IB2013/054325; International Filing date May 24, 2013; Issued Sep. 20, 2013. (5 pages).
Written Opinion for International Application No. PCT/US2013/042606; International filing date May 24, 2013; Issued Sep. 9, 2013. (4 pages).
Written Opinion for International Application No. PCT/US20131042729; International filing date May 24, 2013; Issued Sep. 10, 2013. (6 pages).
XP002712334 Database WPI Week 201058; Thomson Scientific, London, GB, AN 2010-H97109.
XP002713617 Database WPI Week 201205—Thomson Scientific, London, GB; AN—2012-A16221.
XP002713951 Database WPI Week 200340; Thomson Scientific, London, GB, AN 2003-427670.
XP002713952 Database WPI Week 200732; Thomson Scientific, London, GB, AN 2007-336264.
JP 2007-070468 A—Mar. 22, 2007—Machine translation (45 Pages).
KR 10-0435571 B1—Jan. 29, 2003—Machine Translation (16 Pages).
KR 10-435571 B1—Jan. 29, 2003—Abstract Only (1 page).
International Search Report for International Application No. PCT/IB2013/054306; International filing date May 24, 2013; Issued Dec. 13, 2013. (7 pages).
Written Opinion for International Application No. PCT/IB2013/054306; International filing date May 24, 2013; Issued Dec. 13, 2013. (11 pages).
Written Opinion for International Application No. PCT/US2013/042603; International filing date May 5, 2013; Issued Sep. 11, 2013. (7 pages).
XP002712333 Database WPI Week 201205; Thomson Scientific, London, AN 2012-A16221—Jun. 15, 2010 (2 pages).
XP002712334 Database WPI Week 201058; Thomson Scientific, London, GB, AN 2010-H97109—Dec. 17, 2008 (2 pages).
XP002713617 Database WPI Week 201205—Thomson Scientific, London, GB; AN—2012-A16221—Jun. 15, 2010 (2 pages).
XP002713951 Database WPI Week 200340; Thomson Scientific, London, GB, AN 2003-427670—Jan. 29, 2003 (2 pages).
XP002713952 Database WPI Week 200732; Thomson Scientific, London, GB, AN 2007-336264—Feb. 22, 2007 (4 pages).
International Preliminary Report on Patentability for International Application No. PCT/IB2013/054306; International Filing Date May 24, 2013; Report Mail Date Dec. 4, 2014 (12 Pages).
International Preliminary Report on Patentability for International Application No. PCT/IB2013/054310; International Filing Date May 24, 2013; Report Mail Date Dec. 4, 2014 (8 Pages).
International Preliminary Report on Patentability for International Application No. PCT/IB2013/054315; International Filing Date May 24, 2013; Report Mail Date Dec. 4, 2014 (9 Pages).
International Preliminary Report on Patentability for International Application No. PCT/IB2013/054316; International Filing Date May 24, 2013; Report Mail Date Dec. 4, 2014 (6 Pages).
International Preliminary Report on Patentability for International Application No. PCT/IB2013/054322; International Filing Date May 24, 2013; Report Mail Date Dec. 4, 2014 (6 Pages).
International Preliminary Report on Patentability for International Application No. PCT/IB2013/054323; International Filing Date May 24, 2013; Report Mail Date Dec. 4, 2014 (5 Pages).
International Preliminary Report on Patentability for International Application No. PCT/IB2013/054324; International Filing Date May 24, 2013; Report Mail Date Dec. 4, 2014 (7 Pages).
International Preliminary Report on Patentability for International Application No. PCT/IB2013/054325; International Filing Date May 24, 2013; Report Mail Date Dec. 4, 2014 (6 Pages).
International Preliminary Report on Patentability for International Application No. PCT/US2013/042603; International Filing Date May 24, 2013; Report Mail Date Dec. 4, 2014 (9 Pages).
International Preliminary Report on Patentability for International Application No. PCT/US2013/042606; International Filing Date May 24, 2013; Report Mail Date Dec. 4, 2014 (6 Pages).
International Preliminary Report on Patentability for International Application No. PCT/US2013/042729; International Filing Date May 24, 2013; Report Mail Date Dec. 4, 2014 (8 Pages).
Machine Translation of JP 08-081620A. Mar. 26, 1996.
UL 94 AppGuide. MG Chemicals. http://www.mgchemicals.com/downloads/appguide/appguide1105.pdf. As viewed on Dec. 1, 2014. (1 page).

\* cited by examiner

FLAME RETARDANT POLYCARBONATE COMPOSITIONS, METHODS OF MANUFACTURE THEREOF AND ARTICLES COMPRISING THE SAME

CROSS REFERENCE TO RELATED APPLICATIONS

This application claims priority to U.S. Provisional Application No. 61/651,487 filed on May 24, 2012, and to U.S. Provisional Application No. 61/651,481 filed on May 24, 2012, the entire contents of both applications being hereby incorporated by reference.

BACKGROUND

This disclosure relates to flame retardant polycarbonate compositions, methods of manufacture thereof and to articles comprising the same.

In electronic and electrical devices such as notebook personal computers, e-books, and tablet personal computers, metallic body panels are being replaced by materials that are lighter in weight and offer a robust combination of mechanical properties. These lighter materials result in weight savings, cost savings, and enable the manufacture of complex designs. While these lighter materials can be used to manufacture panels having thinner cross-sectional thicknesses, it is desirable to improve the stiffness of the material to prevent warping. It is also desirable to improve the flame retardancy of the material to reduce fire related hazards.

SUMMARY

Disclosed herein is a flame retardant composition comprising 20 to 80 weight percent of a polycarbonate composition; where the polycarbonate composition comprises a polysiloxane-carbonate copolymer; an impact modifier in an amount of 0.5 to 25 weight percent; and 1 to 20 weight percent of a phosphazene compound; where all weight percents are based on the total weight of the flame retardant composition.

Disclosed herein too is a method comprising blending 20 to 80 weight percent of a polycarbonate composition; where the polycarbonate composition comprises a polysiloxane-carbonate copolymer; an impact modifier in an amount of 0.5 to 25 weight percent; and 1 to 20 weight percent of a phosphazene compound to produce a flame retardant composition; where all weight percents are based on the total weight of the flame retardant composition; and extruding and molding the flame retardant composition. Disclosed herein too are articles manufactured from the composition.

DETAILED DESCRIPTION

Disclosed herein is a flame retardant composition that displays a suitable combination of stiffness and ductility as well as a low melt viscosity that renders it easily processable. The flame retardant polycarbonate composition comprises a polycarbonate composition, an impact modifier, and a flame retardant that comprises a phosphazene compound. The flame retardant composition have improved heat resistance, while maintaining good impact properties, flame retardance, ductility, and melt stability. The flame retardant composition displays an advantageous combination of properties that renders it useful in electronics goods such as notebook personal computers, e-books, tablet personal computers, and the like.

Disclosed herein too is a method of manufacturing the flame retardant composition. The method comprises mixing a polycarbonate composition, an impact modifier, and a flame retardant that comprises a phosphazene compound to produce the flame retardant composition.

In an embodiment, the polycarbonate composition comprises a polysiloxane-carbonate copolymer. In addition to the polysiloxane-carbonate copolymer, the polycarbonate composition may comprise a linear polycarbonate, a branched polycarbonate, or a mixture of a linear polycarbonate and a branched polycarbonate. In another embodiment, in addition to the polysiloxane-carbonate copolymer, the polycarbonate composition may comprise a copolycarbonate that manufactured from a dihydroxy compound that comprises 3,3-bis(4-hydroxyphenyl)-2-phenylisoindolin-1-one, 4,4'-(1-phenylethane-1,1-diyl)diphenol (also called "bisphenol AP") or 1,1-bis(4-hydroxyphenyl)-3,3,5-trimethylcyclohexane). The presence of a copolycarbonate that comprises dihydroxy compound that comprises 3,3-bis(4-hydroxyphenyl)-2-phenylisoindolin-1-one, 4,4'-(1-phenylethane-1,1-diyl)diphenol or 1,1-bis(4-hydroxyphenyl)-3,3,5-trimethylcyclohexane) causes an improvement in the heat distortion temperature, the impact strength as well as the flame retardancy of the flame retardant composition.

The term "polycarbonate composition", "polycarbonate" and "polycarbonate resin" mean compositions having repeating structural carbonate units of the formula (1):

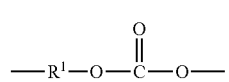

(1)

wherein at least 60 percent of the total number of $R^1$ groups may contain aromatic organic groups and the balance thereof are aliphatic or alicyclic, or aromatic groups. $R^1$ in the carbonate units of formula (1) may be a $C_6$-$C_{36}$ aromatic group wherein at least one moiety is aromatic. Each $R^1$ may be an aromatic organic group, for example, a group of the formula (2):

$$-A^1-Y^1-A^2- \qquad (2)$$

wherein each of the $A^1$ and $A^2$ is a monocyclic divalent aryl group and $Y^1$ is a bridging group having one or two atoms that separate $A^1$ and $A^2$. For example, one atom may separate $A^1$ from $A^2$, with illustrative examples of these groups including —O—, —S—, —S(O)—, —S(O)$_2$)—, —C(O)—, methylene, cyclohexyl-methylene, 2-[2.2.1]-bicycloheptylidene, ethylidene, isopropylidene, neopentylidene, cyclohexylidene, cyclopentadecyclidene, cyclododecylidene, and adamantylidene. The bridging group of $Y^1$ may be a hydrocarbon group or a saturated hydrocarbon group such as methylene, cyclohexylidene, or isopropylidene.

The polycarbonates may be produced from dihydroxy compounds having the formula HO—$R^1$—OH, wherein $R^1$ is defined as above for formula (1). The formula HO—$R^1$—OH includes dihydroxy compounds of the formula (3):

$$HO-A^1-Y^1-A^2-OH \qquad (3)$$

wherein $Y^1$, $A^1$, and $A^2$ are as described above. For example, one atom may separate $A^1$ and $A^2$. Each $R^1$ may include a diphenol compound of the general formula (4):

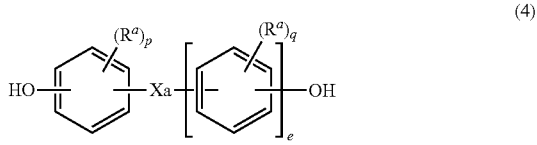

(4)

where $X_a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. For example, the bridging group $X_a$ may be single bond, —O—, —C(O)—, or a $C_{1-18}$ organic group. The $C_{1-18}$ organic bridging group may be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. $R^a$ and $R^b$ may each represent a halogen, $C_{1-12}$ alkyl group, or a combination thereof. For example, $R^a$ and $R^b$ may each be a $C_{1-3}$ alkyl group, specifically methyl, disposed meta to the hydroxy group on each arylene group. The designation (e) is 0 or 1. The numbers p and q are each independently integers of 0 to 4. It will be understood that when p or q is less than 4, the remaining valence of each carbon of the ring is filled by hydrogen.

$X_a$ may be substituted or unsubstituted $C_{3-18}$ cycloalkylidene, a $C_{1-25}$ alkylidene of formula —$C(R^c)(R^d)$— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —$C(=R^e)$— wherein $R^e$ is a divalent $C_{1-12}$ hydrocarbon group. This may include methylene, cyclohexylmethylene, ethylidene, neopentylidene, isopropylidene, 2-[2.2.1]-bicycloheptylidene, cyclohexylidene, cyclopentylidene, cyclododecylidene, and adamantylidene. A specific example wherein $X_a$ is a substituted cycloalkylidene is the cyclohexylidene-bridged, alkyl-substituted bisphenol of formula (5):

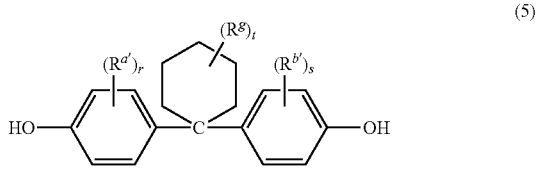

(5)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. $R^{a'}$ and $R^{b'}$ may be disposed meta to the cyclohexylidene bridging group. The substituents $R^{a'}$, $R^{b'}$ and $R^g$ may, when comprising an appropriate number of carbon atoms, be straight chain, cyclic, bicyclic, branched, saturated, or unsaturated. For example, $R^g$ may be each independently $C_{1-4}$ alkyl, $R^g$ is $C_{1-4}$ alkyl, r and s are each 1, and t is 0 to 5. In another example, $R^{a'}$, $R^{b'}$ and $R^g$ may each be methyl, r and s are each 1, and t is 0 or 3. The cyclohexylidene-bridged bisphenol can be the reaction product of two moles of o-cresol with one mole of cyclohexanone. In another example, the cyclohexylidene-bridged bisphenol may be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC® trade name.

In an embodiment, $X_a$ is a $C_{1-18}$ alkylene group, a $C_{3-18}$ cycloalkylene group, a fused $C_{6-18}$ cycloalkylene group, or a group of the formula —$B_1$—W—$B_2$— wherein $B_1$ and $B_2$ are the same or different $C_{1-6}$ alkylene group and W is a $C_{3-12}$ cycloalkylidene group or a $C_{6-16}$ arylene group.

In another example $X_a$ may be a substituted $C_{3-18}$ cycloalkylidene of the formula (6):

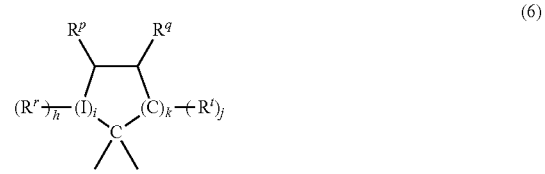

(6)

wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, $C_{6-12}$ aryl, or $C_{1-12}$ acyl; h is 0 to 2, j is 1 or 2, i is an integer of 0 or 1, and k is an integer of 0 to 3, with the proviso that at least two of $R^r$, $R^p$, $R^q$ and $R^t$ taken together are a fused cycloaliphatic, aromatic, or heteroaromatic ring. It will be understood that where the fused ring is aromatic, the ring as shown in formula (5) will have an unsaturated carbon-carbon linkage at the junction where the ring is fused. When i is 0, h is 0, and k is 1, the ring as shown in formula (5) contains 4 carbon atoms; when i is 0, h is 0, and k is 2, the ring as shown contains 5 carbon atoms, and when i is 0, h is 0, and k is 3, the ring contains 6 carbon atoms. In one example, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful dihydroxy compounds having the formula HO—$R^1$—OH include aromatic dihydroxy compounds of formula (7):

(7)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Bisphenol-type dihydroxy aromatic compounds may include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3- bromophenyl)propane, 1,1-bis(hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as a combination comprising at least one of the foregoing dihydroxy aromatic compounds.

Examples of the types of bisphenol compounds represented by formula (3) may include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PBPP"), 9,9-bis(4-hydroxyphenyl)fluorene, and 1,1-bis(4-hydroxy-3-methylphenyl)cyclohexane ("DMBPC"). Combinations comprising at least one of the foregoing dihydroxy aromatic compounds can also be used.

The dihydroxy compounds of formula (3) may exist in the form of the following formula (8):

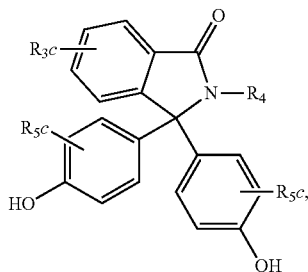

(8)

wherein $R_3$ and $R_5$ are each independently a halogen or a $C_{1-6}$ alkyl group, $R_4$ is a $C_{1-6}$ alkyl, phenyl, or phenyl substituted with up to five halogens or $C_{1-6}$ alkyl groups, and c is 0 to 4. In a specific embodiment, $R_4$ is a $C_{1-6}$ alkyl or phenyl group.

In still another embodiment, $R_4$ is a methyl or phenyl group. In another specific embodiment, each c is 0.

The dihydroxy compounds of formula (3) may be the following formula (9):

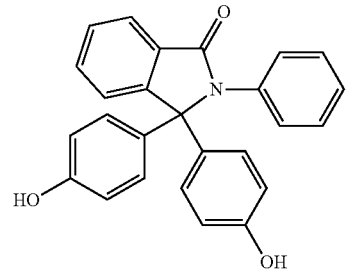

(9)

(also known as 3,3-bis(4-hydroxyphenyl)-2-phenylisoindolin-1-one (PPPBP)).

Alternatively, the dihydroxy compounds of formula (3) may have the following formula (10):

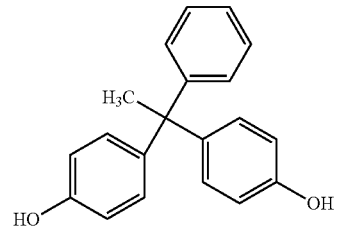

(10)

(also known as 4,4'-(1-phenylethane-1,1-diyl)diphenol (bisphenol AP) or 1,1-bis(4-hydroxyphenyl)-1-phenylethane).

Alternatively, the dihydroxy compounds of formula (3) may have the following formula (11):

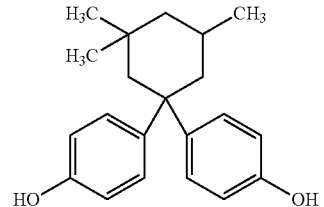

(11)

which is also known as 1,1-bis(4-hydroxyphenyl)-3,3,5-trimethylcyclohexane, or 4,4'-(3,3,5-trimethylcyclohexane-1,1-diyl)diphenol (bisphenol TMC).

When the structure of formulas (10) or (11) are used in preparing a copolycarbonate, the polycarbonate composition comprises the copolycarbonate in amounts of 2 to 15, specifically 3 to 14 and more specifically 4 to 10 weight percent, based on the total weight of the flame retardant composition.

Exemplary copolymers containing polycarbonate units may be derived from bisphenol A. In an embodiment, the polycarbonate composition may comprise a polyester-polycarbonate copolymer. A specific type of copolymer may be a polyestercarbonate, also known as a polyester-polycarbonate. As used herein, these terms (i.e., the polyestercarbonate and the polyester-polycarbonate) are synonymous. Such copolymers further contain, in addition to recurring carbonate chain units of the formula (1) as described above, repeating ester units of formula (12):

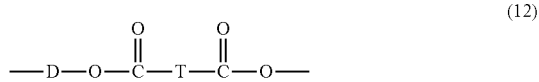
(12)

wherein O-D-O is a divalent group derived from a dihydroxy compound, and D may be, for example, one or more alkyl containing $C_6$-$C_{20}$ aromatic group(s), or one or more $C_6$-$C_{20}$ aromatic group(s), a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms. D may be a $C_{2-30}$ alkylene group having a straight chain, branched chain, or cyclic (including polycyclic) structure. O-D-O may be derived from an aromatic dihydroxy compound of formula (3) above. O-D-O may be derived from an aromatic dihydroxy compound of formula (4) above. O-D-O may be derived from an aromatic dihydroxy compound of formula (7) above.

The molar ratio of ester units to carbonate units in the copolymers may vary broadly, for example 1:99 to 99:1, specifically 10:90 to 90:10, and more specifically 25:75 to 75:25, depending on the desired properties of the final composition.

T of formula (12) may be a divalent group derived from a dicarboxylic acid, and may be, for example, a $C_{2-10}$ alkylene group, a $C_{6-20}$ alicyclic group, a $C_{6-20}$ alkyl aromatic group, a $C_{6-20}$ aromatic group, or a $C_6$ to $C_{36}$ divalent organic group derived from a dihydroxy compound or chemical equivalent thereof. In an embodiment, T is an aliphatic group. T may be derived from a $C_6$-$C_{20}$ linear aliphatic alpha-omega ($\alpha\Omega$) dicarboxylic ester.

Diacids from which the T group in the ester unit of formula (12) is derived include aliphatic dicarboxylic acid from 6 to 36 carbon atoms, optionally from 6 to 20 carbon atoms. The $C_6$-$C_{20}$ linear aliphatic alpha-omega ($\alpha\Omega$) dicarboxylic esters may be derived from adipic acid, sebacic acid, 3,3-dimethyl adipic acid, 3,3,6-trimethyl sebacic acid, 3,3,5,5-tetramethyl sebacic acid, azelaic acid, dodecanedioic acid, dimer acids, cyclohexane dicarboxylic acids, dimethyl cyclohexane dicarboxylic acid, norbornane dicarboxylic acids, adamantane dicarboxylic acids, cyclohexene dicarboxylic acids, $C_{14}$, $C_{18}$ and $C_{20}$ diacids.

In an embodiment, aliphatic alpha-omega dicarboxylic acids that may be reacted with a bisphenol to form a polyester include adipic acid, sebacic acid or dodecanedioic acid. Sebacic acid is a dicarboxylic acid having the following formula (13):

(13)

Sebacic acid has a molecular mass of 202.25 g/mol, a density of 1.209 g/cm$^3$ (25° C.), and a melting point of 294.4° C. at 100 mm Hg. Sebacic acid may be derived from castor oil.

Other examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids may be terephthalic acid, isophthalic acid, naphthalene dicarboxylic acid, cyclohexane dicarboxylic acid, sebacic acid, or combinations thereof.

Mixtures of the diacids can also be employed. It should be noted that although referred to as diacids, any ester precursor could be employed such as acid halides, specifically acid chlorides, and diaromatic esters of the diacid such as diphenyl, for example, the diphenylester of sebacic acid. The diacid carbon atom number does not include any carbon atoms that may be included in the ester precursor portion, for example diphenyl. It may be desirable that at least four, five, or six carbon bonds separate the acid groups. This may reduce the formation of undesirable and unwanted cyclic species. The aromatic dicarboxylic acids may be used in combination with the saturated aliphatic alpha-omega dicarboxylic acids to yield the polyester. In an exemplary embodiment, isophthalic acid or terephthalic acid may be used in combination with the sebacic acid to produce the polyester.

Overall, D of the polyester-polycarbonate may be a $C_{2-9}$ alkylene group and T is p-phenylene, m-phenylene, naphthalene, a divalent cycloaliphatic group, or a combination thereof. This class of polyester includes the poly(alkylene terephthalates).

The polyester-polycarbonate may have a bio-content (i.e., a sebacic acid content) according to ASTM-D-6866 of 2 weight percent (wt %) to 65 wt %, based on the total weight of the polycarbonate composition. In an embodiment, the polyester-polycarbonate may have a bio-content according to ASTM-D-6866 of at least 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 25 wt %, 30 wt %, 35 wt %, 40 wt %, 45 wt %, 50 wt %, 55 wt %, 60 wt % or 65 wt % of the composition derived therefrom. The polyester-polycarbonate may have a bio-content according to ASTM-D-6866 of at least 5 wt % of the polycarbonate composition. In other words, the polycarbonate composition may have at least 5 wt % of sebacic acid.

In an embodiment, two polycarbonate copolymers may be used in the flame retardant composition. The first polycarbonate copolymer comprises a polyester derived from sebacic acid that is copolymerized with a polycarbonate. The first polycarbonate copolymer is endcapped with phenol or t-butylphenol. The second polycarbonate copolymer also comprises a polyester derived from sebacic acid that is copolymerized with a polycarbonate. The second polycarbonate copolymer is endcapped with para-cumyl phenol (PCP). The first polycarbonate has a lower molecular weight than the second polycarbonate copolymer.

The first polycarbonate copolymer has a weight average molecular weight of 15,000 to 28,000 Daltons, specifically 17,000 to 25,500 Daltons, specifically 19,000 to 23,000 Daltons, and more specifically 20,000 to 22,000 Daltons as measured by gel permeation chromatography using a polycarbonate standard. The first polycarbonate copolymer may comprise 3.0 mole % to 8.0 mole %, specifically 4.0 mole % to 7.5 mole %, and more specifically 5.0 mole % to 6.5 mole % of the polyester derived from sebacic acid.

The first polycarbonate copolymer is used in amounts of 10 to 60 wt %, specifically 15 to 46 wt %, specifically 20 to 43 wt %, and more specifically 23 to 40 wt %, based on the total weight of the flame retardant composition.

In an embodiment, the second polycarbonate copolymer is endcapped with para-cumyl phenol and has a weight average molecular weight of 30,000 to 45,000 Daltons, specifically 32,000 to 40,000 Daltons, specifically 34,000 to 39,000 Daltons, more specifically 35,000 to 38,000 Daltons as measured by gel permeation chromatography using a polycarbonate standard. The second polycarbonate copolymer may comprise 7 mole % to 12 mole %, specifically 7.5 mole % to 10 mole %, and more specifically 8.0 mole % to 9.0 mole % of polyester derived from sebacic acid.

The second polycarbonate copolymer is used in amounts of 10 to 35 wt %, specifically 12 to 32 wt %, specifically 15 to 30 wt %, specifically 18 to 28 wt %, and more specifically 20 to 37 wt %, based on the total weight of the flame retardant composition.

Overall, the first and the second polycarbonate copolymers may contain 1 to 15 wt %, specifically 2 to 12 wt %, specifically 3 to 10 wt %, specifically 4 to 9 wt %, and more specifically 5 to 8 wt % of the polyester derived from sebacic acid. The polyester-polycarbonate copolymer may comprise 1.0 wt %, 2.0 wt %, 3.0 wt %, 4.0 wt %, 5.0 wt %, 6.0 wt %, 7.0 wt %, 8.0 wt %, 9.0 wt %, 10.0 wt %, 11.0 wt %, 12.0 wt %, 13.0 wt %, 14.0 wt %, and 15.0 wt % of a polyester derived from sebacic acid.

In one form, the first and second polycarbonate copolymers are polyester-polycarbonate copolymers where the polyester is derived by reacting sebacic acid with bisphenol A and where the polycarbonate is obtained from the reaction of bisphenol A with phosgene. The first and second polycarbonate copolymers containing the polyester-polycarbonate copolymer has the following formula (14):

boxylic acid, bisphenol and phosgene initially at a low pH (4 to 6) to get a high incorporation of the diacid in the polymer, and then after a proportion of the monomer has been incorporated into the growing polymer chain, switching to a high pH (10 to 11) to convert any anhydride groups into ester linkages. Anhydride linkages can be determined by numerous methods such as, for instance proton NMR analyses showing signal for the hydrogens adjacent to the carbonyl group. In an embodiment, the first and the second polycarbonate copolymer have a low amount of anhydride linkages, such as, for example, less than or equal to 5 mole %, specifically less than or equal to 3 mole %, and more specifically less than or equal to 2 mole %, as determined by proton NMR analysis. Low amounts of anhydride linkages in the polyester-polycarbonate copolymer contribute to superior melt stability in the copolymer, as well as other desirable properties.

Useful polyesters that can be copolymerized with polycarbonate can include aromatic polyesters, poly(alkylene esters) including poly(alkylene arylates), and poly(cycloalkylene diesters). Aromatic polyesters can have a polyester structure according to formula (12), wherein D and T are each aromatic groups as described hereinabove. In an embodiment, useful aromatic polyesters can include, for example, poly(isophthalate-terephthalate-resorcinol) esters, poly(isophthalate-terephthalate-bisphenol A) esters, poly[(isophthalate-terephthalate-resorcinol) ester-co-(isophthalate-terephthalate-bisphenol A)]ester, or a combination comprising at least one of these. Also contemplated are aromatic polyesters with a

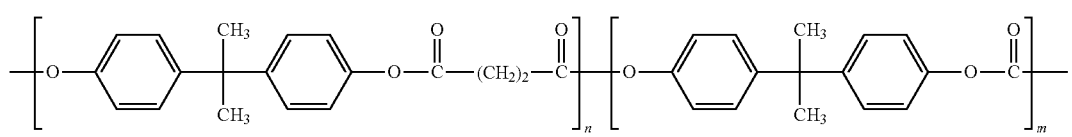

(14)

Formula (14) may be designed to be a high flow ductile (HFD) polyester-polycarbonate copolymer (HFD). The high flow ductile copolymer has a low molecular (LM) weight polyester derived from sebacic acid. The polyester derived from sebacic acid in the high flow ductile copolymer is present in an amount of 6.0 mole % to 8.5 mole %. In an embodiment, the polyester derived from sebacic acid has a weight average molecular weight of 21,000 to 36,500 Daltons. In an exemplary embodiment, the high flow ductile polyester-polycarbonate copolymer may have a weight average molecular weight average of 21,500 Daltons as measured by gel permeation chromatography using a polycarbonate standard. It is desirable for the high flow ductile polyester-polycarbonate copolymer to contain 6.0 mole % derived from sebacic acid.

The first and the second polycarbonate copolymer that comprises the polyester-polycarbonate copolymers beneficially have a low level of carboxylic anhydride groups. Anhydride groups are where two aliphatic diacids, or chemical equivalents, react to form an anhydride linkage. The amount of carboxylic acid groups bound in such anhydride linkages should be less than or equal to 10 mole % of the total amount of carboxylic acid content in the copolymer. In other embodiments, the anhydride content should be less than or equal to 5 mole % of carboxylic acid content in the copolymer, and in yet other embodiments, the carboxylic acid content in the copolymer should be less than or equal to 2 mole %.

Low levels of anhydride groups can be achieved by conducting an interfacial polymerization reaction of the dicarminor amount, e.g., 0.5 to 10 weight percent, based on the total weight of the polyester, of units derived from an aliphatic diacid and/or an aliphatic polyol to make copolyesters. Poly(alkylene arylates) can have a polyester structure according to formula (12), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene)dimethylene. Examples of poly(alkylene terephthalates) include poly(ethylene terephthalate) (PET), poly(1,4-butylene terephthalate) (PBT), and polypropylene terephthalate) (PPT). Also useful are poly(alkylene naphthoates), such as poly(ethylene naphthanoate) (PEN), and poly(butylene naphthanoate) (PBN). A specifically useful poly(cycloalkylene diester) is poly(cyclohexanedimethylene terephthalate) (PCT). Combinations comprising at least one of the foregoing polyesters can also be used.

Copolymers comprising alkylene terephthalate repeating ester units with other ester groups can also be useful. Specifically useful ester units can include different alkylene terephthalate units, which can be present in the polymer chain as individual units, or as blocks of poly(alkylene terephthalates). Copolymers of this type include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexane-dimethanol-1,4-cyclohexanedicarboxylate) (PCCD), having recurring units of formula (14a)

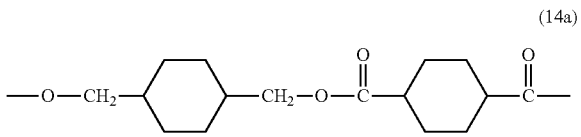

wherein, as described using formula (12), D is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

The polycarbonate and polyester can be used in a weight ratio of 1:99 to 99:1, specifically 10:90 to 90:10, and more specifically 30:70 to 70:30, depending on the function and properties desired.

It is desirable for such a polyester and polycarbonate blend to have an MVR of 5 to 150 cc/10 min., specifically 7 to 125 cc/10 min, more specifically 9 to 110 cc/10 min, and still more specifically 10 to 100 cc/10 min., measured at 300° C. and a load of 1.2 kilograms according to ASTM D1238-04.

Polycarbonates may be manufactured by processes such as interfacial polymerization and melt polymerization. Copolycarbonates having a high glass transition temperature are generally manufactured using interfacial polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. The most commonly used water immiscible solvents include methylene chloride, 1,2-dichloroethane, chlorobenzene, toluene, and the like.

Exemplary carbonate precursors may include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. For example, an interfacial polymerization reaction to form carbonate linkages uses phosgene as a carbonate precursor, and is referred to as a phosgenation reaction.

Among tertiary amines that can be used are aliphatic tertiary amines such as triethylamine, tributylamine, cycloaliphatic amines such as N,N-diethyl-cyclohexylamine and aromatic tertiary amines such as N,N-dimethylaniline.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. An effective amount of a phase transfer catalyst can be 0.1 to 10 wt % based on the weight of bisphenol in the phosgenation mixture. For example, an effective amount of phase transfer catalyst can be 0.5 to 2 wt % based on the weight of bisphenol in the phosgenation mixture.

Alternatively, melt processes can be used to make the polycarbonates. Melt polymerization may be conducted as a batch process or as a continuous process. In either case, the melt polymerization conditions used may comprise two or more distinct reaction stages, for example, a first reaction stage in which the starting dihydroxy aromatic compound and diaryl carbonate are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight of about 1,000 to about 7,500 Daltons. In one or more subsequent polymerization stages, the number average molecular weight (Mn) of the polycarbonate is increased to between about 8,000 and about 25,000 Daltons (using polycarbonate standard).

The term "melt polymerization conditions" is understood to mean those conditions necessary to effect reaction between a dihydroxy aromatic compound and a diaryl carbonate in the presence of a transesterification catalyst. Typically, solvents are not used in the process, and the reactants dihydroxy aromatic compound and the diaryl carbonate are in a molten state. The reaction temperature can be about 100° C. to about 350° C., specifically about 180° C. to about 310° C. The pressure may be at atmospheric pressure, supra-atmospheric pressure, or a range of pressures from atmospheric pressure to about 15 torr in the initial stages of the reaction, and at a reduced pressure at later stages, for example about 0.2 to about 15 torr. The reaction time is generally about 0.1 hours to about 10 hours.

The diaryl carbonate ester can be diphenyl carbonate, or an activated diphenyl carbonate having electron-withdrawing substituents on the aryl groups, such as bis(4-nitrophenyl) carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing.

Catalysts used in the melt polymerization of polycarbonates can include alpha or beta catalysts. Beta catalysts are typically volatile and degrade at elevated temperatures. Beta catalysts are therefore preferred for use at early low-temperature polymerization stages. Alpha catalysts are typically more thermally stable and less volatile than beta catalysts.

The alpha catalyst can comprise a source of alkali or alkaline earth ions. The sources of these ions include alkali metal hydroxides such as lithium hydroxide, sodium hydroxide, and potassium hydroxide, as well as alkaline earth hydroxides such as magnesium hydroxide and calcium hydroxide. Other possible sources of alkali and alkaline earth metal ions include the corresponding salts of carboxylic acids (such as sodium acetate) and derivatives of ethylene diamine tetraacetic acid (EDTA) (such as EDTA tetrasodium salt, and EDTA magnesium disodium salt). Other alpha transesterification catalysts include alkali or alkaline earth metal salts of a non-volatile inorganic acid such as $NaH_2PO_3$, $NaH_2PO_4$, $Na_2HPO_3$, $KH_2PO_4$, $CsH_2PO_4$, $Cs_2HPO_4$, and the like, or mixed salts of phosphoric acid, such as $NaKHPO_4$, $CsNaHPO_4$, $CsKHPO_4$, and the like. Combinations comprising at least one of any of the foregoing catalysts can be used.

Possible beta catalysts can comprise a quaternary ammonium compound, a quaternary phosphonium compound, or a combination comprising at least one of the foregoing. The quaternary ammonium compound can be a compound of the structure $(R^4)_4N^+X^-$, wherein each $R^4$ is the same or different, and is a $C_{1-20}$ alkyl group, a $C_{4-20}$ cycloalkyl group, or a $C_{4-20}$ aryl group; and $X^-$ is an organic or inorganic anion, for example a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often used. The quaternary phosphonium compound can be a compound of the structure $(R^5)_4P^+X^-$, wherein each $R^5$ is the same or different, and is a $C_{1-20}$ alkyl group, a $C_{4-20}$ cycloalkyl group, or a $C_{4-20}$ aryl group; and $X^-$ is an organic or inorganic anion, for example a hydroxide, halide, carboxylate, sulfonate, sulfate, formate, carbonate, or bicarbonate. Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents $2(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often used.

The amount of alpha and beta catalyst used can be based upon the total number of moles of dihydroxy compound used in the polymerization reaction. When referring to the ratio of beta catalyst, for example a phosphonium salt, to all dihydroxy compounds used in the polymerization reaction, it is convenient to refer to moles of phosphonium salt per mole of the dihydroxy compound, meaning the number of moles of phosphonium salt divided by the sum of the moles of each individual dihydroxy compound present in the reaction mixture. The alpha catalyst can be used in an amount sufficient to provide $1\times10^{-2}$ to $1\times10^{-8}$ moles, specifically, $1\times10^{-4}$ to $1\times10^{-7}$ moles of metal per mole of the dihydroxy compounds used. The amount of beta catalyst (e.g., organic ammonium or phosphonium salts) can be $1\times10^{-2}$ to $1\times10^{-5}$, specifically $1\times10^{-3}$ to $1\times10^{-4}$ moles per total mole of the dihydroxy compounds in the reaction mixture.

All types of polycarbonate end groups are contemplated as being useful in the high and low glass transition temperature polycarbonates, provided that such end groups do not significantly adversely affect desired properties of the compositions. An end-capping agent (also referred to as a chain-stopper) can be used to limit molecular weight growth rate, and so control molecular weight of the first and/or second polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as para-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. In an embodiment, at least one of the copolymers is endcapped with para-cumyl phenol (PCP).

Endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In an embodiment, the endgroup of a polycarbonate can comprise a structural unit derived from a diaryl carbonate, where the structural unit can be an endgroup. In a further embodiment, the endgroup is derived from an activated carbonate. Such endgroups can derive from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In an embodiment, the ester endgroup derived from a salicylic ester can be a residue of BMSC or other substituted or unsubstituted bis(alkyl salicyl)carbonate such as bis(ethyl salicyl)carbonate, bis(propyl salicyl)carbonate, bis(phenyl salicyl)carbonate, bis(benzyl salicyl)carbonate, or the like. In a specific embodiment, where BMSC is used as the activated carbonyl source, the endgroup is derived from and is a residue of BMSC, and is an ester endgroup derived from a salicylic acid ester, having the structure of formula (15):

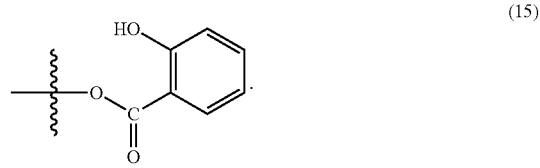 [SMILES: *OC(=O)c1ccccc1O]

(15)

The reactants for the polymerization reaction using an activated aromatic carbonate can be charged into a reactor either in the solid form or in the molten form. Initial charging of reactants into a reactor and subsequent mixing of these materials under reactive conditions for polymerization may be conducted in an inert gas atmosphere such as a nitrogen atmosphere. The charging of one or more reactant may also be done at a later stage of the polymerization reaction. Mixing of the reaction mixture is accomplished by stirring or other forms of agitation. Reactive conditions include time, temperature, pressure and other factors that affect polymerization of the reactants. In an embodiment, the activated aromatic carbonate is added at a mole ratio of 0.8 to 1.3, and more specifically 0.9 to 1.3, and all sub-ranges there between, relative to the total moles of monomer unit compounds. In a specific embodiment, the molar ratio of activated aromatic carbonate to monomer unit compounds is 1.013 to 1.29, specifically 1.015 to 1.028. In another specific embodiment, the activated aromatic carbonate is BMSC.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, tris-phenol TC (1,3,5-tris ((p-hydroxyphenyl)isopropyl)benzene), tris-phenol PA (4(4 (1,1-bis(p-hydroxyphenyl)-ethyl)alpha,alpha-dimethyl benzyl)phenol), 4-chloroformyl phthalic anhydride, trimesic acid, and benzophenone tetracarboxylic acid. Combinations comprising linear polycarbonates and branched polycarbonates can be used.

In some embodiments, a particular type of branching agent is used to create branched polycarbonate materials. These branched polycarbonate materials have statistically more than two end groups. The branching agent is added in an amount (relative to the bisphenol monomer) that is sufficient to achieve the desired branching content, that is, more than two end groups. The molecular weight of the polymer may become very high upon addition of the branching agent, and to avoid excess viscosity during polymerization, an increased amount of a chain stopper agent can be used, relative to the amount used when the particular branching agent is not present. The amount of chain stopper used is generally above 5 mole percent and less than 20 mole percent compared to the bisphenol monomer.

Such branching agents include aromatic triacyl halides, for example triacyl chlorides of formula (15)

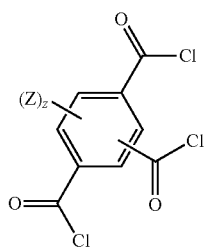

(15)

wherein Z is a halogen, $C_{1-3}$ alkyl, $C_{1-3}$ alkoxy, $C_{7-12}$ arylalkylene, $C_{7-12}$ alkylarylene, or nitro, and z is 0 to 3; a trisubstituted phenol of formula (16)

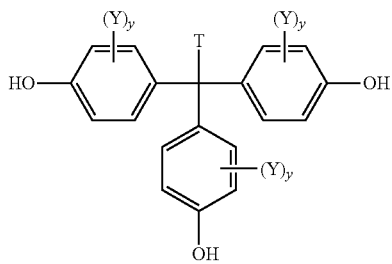

(16)

wherein T is a $C_{1-20}$ alkyl, $C_{1-20}$ alkyleneoxy, $C_{7-12}$ arylalkyl, or $C_{7-12}$ alkylaryl, Y is a halogen, $C_{1-3}$ alkyl, $C_{1-3}$ alkoxy, $C_{7-12}$ arylalkyl, $C_{7-12}$ alkylaryl, or nitro, s is 0 to 4; or a compound of formula (17) (isatin-bis-phenol).

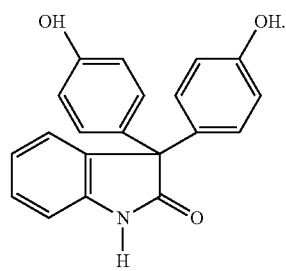

(17)

Examples of specific branching agents that are particularly effective in the compositions include trimellitic trichloride (TMTC), tris-p-hydroxyphenylethane (THPE), and isatin-bis-phenol.

The amount of the branching agents used in the manufacture of the polymer will depend on a number of considerations, for example the type of $R^1$ groups, the amount of chain stopper, e.g., cyanophenol, and the desired molecular weight of the polycarbonate. In general, the amount of branching agent is effective to provide about 0.1 to 10 branching units per 100 $R^1$ units, specifically about 0.5 to 8 branching units per 100 $R^1$ units, and more specifically about 0.75 to 5 branching units per 100 $R^1$ units. For branching agents having formula (15), the branching agent triester groups are present in an amount of about 0.1 to 10 branching units per 100 $R^1$ units, specifically about 0.5 to 8 branching units per 100 $R^1$ units, and more specifically about 0.75 to 5 branching agent triester units per 100 $R^1$ units. For branching agents having formula (16) or (17), the branching agent triphenyl carbonate groups formed are present in an amount of about 0.1 to 10 branching units per 100 $R^1$ units, specifically about 0.5 to 8 branching units per 100 $R^1$ units, and more specifically about 0.75 to 5 triphenylcarbonate units per 100 $R^1$ units. In some embodiments, a combination of two or more branching agents may be used. Alternatively, the branching agents can be added at a level of about 0.05 to about 2.0 wt. %.

In an embodiment, the polycarbonate is a branched polycarbonate comprising units as described above; greater than or equal to 3 mole %, based on the total moles of the polycarbonate, of moieties derived from a branching agent; and end-capping groups derived from an end-capping agent having a pKa between about 8.3 and about 11. The branching agent can comprise trimellitic trichloride, 1,1,1-tris(4-hydroxyphenyl)ethane or a combination of trimellitic trichloride and 1,1,1-tris(4-hydroxyphenyl)ethane, and the end-capping agent is phenol or a phenol containing a substituent of cyano group, aliphatic groups, olefinic groups, aromatic groups, halogens, ester groups, ether groups, or a combination comprising at least one of the foregoing. In a specific embodiment, the end-capping agent is phenol, p-t-butylphenol, p-methoxyphenol, p-cyanophenol, p-cumylphenol, or a combination comprising at least one of the foregoing.

In an embodiment, the polycarbonate is a branched polycarbonate comprising units as described above; greater than or equal to 3 mole %, based on the total moles of the polycarbonate, of moieties derived from a branching agent; and end-capping groups derived from an end-capping agent having a pKa between about 8.3 and about 11. The branching agent can comprise trimellitic trichloride, 1,1,1-tris(4-hydroxyphenyl)ethane or a combination of trimellitic trichloride and 1,1,1-tris(4-hydroxyphenyl)ethane, and the end-capping agent is phenol or a phenol containing a substituent of cyano group, aliphatic groups, olefinic groups, aromatic groups, halogens, ester groups, ether groups, or a combination comprising at least one of the foregoing. In a specific embodiment, the end-capping agent is phenol, p-t-butylphenol, p-methoxyphenol, p-cyanophenol, p-cumylphenol, or a combination comprising at least one of the foregoing.

As noted above, the polycarbonate composition may include a linear polycarbonate, a branched polycarbonate, or a mixture of a linear and a branched polycarbonate. When the polycarbonate composition includes a mixture of a linear and a branched polycarbonate, the branched polycarbonate is used in amounts of 5 to 95 wt %, specifically 10 to wt % and more specifically 12 to 20 wt %, based on the total weight of the polycarbonate composition. Linear polycarbonates are used in amounts of 5 to 95 wt %, specifically 20 to 60 wt %, and more specifically 25 to 55 wt %, based on the total weight of the polycarbonate composition.

The polycarbonate composition is used in amounts of 20 to 80 wt %, specifically to 70 wt %, and more specifically 40 to 60 wt %, based on the total weight of the flame retardant composition.

The polycarbonate composition may further comprise a polysiloxane-polycarbonate copolymer, also referred to as a polysiloxane-carbonate. The polydiorganosiloxane (also referred to herein as "siloxane") blocks of the copolymer comprise repeating diorganosiloxane units as in formula (19)

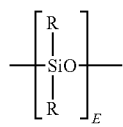
(19)

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. Combinations of the foregoing R groups can be used in the same copolymer.

The value of E in formula (19) can vary widely depending on the type and relative amount of each component in the flame retardant composition, the desired properties of the composition, and like considerations. Generally, E has an average value of 2 to 1,000, specifically 3 to 500, more specifically 5 to 100. In an embodiment, E has an average value of 10 to 75, and in still another embodiment, E has an average value of 40 to 60. Where E is of a lower value, e.g., less than 40, it can be desirable to use a relatively larger amount of the polycarbonate-polysiloxane copolymer. Conversely, where E is of a higher value, e.g., greater than 40, a relatively lower amount of the polycarbonate-polysiloxane copolymer can be used.

A combination of a first and a second (or more) polycarbonate-polysiloxane copolymers can be used, wherein the average value of E of the first copolymer is less than the average value of E of the second copolymer.

In another embodiment, the polysiloxane blocks are of formula (20)

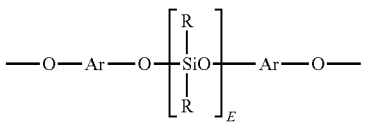
(20)

wherein E is as defined above; each R can be the same or different, and is as defined above; and Ar can be the same or different, and is a substituted or unsubstituted $C_6$-$C_{30}$ arylene group, wherein the bonds are directly connected to an aromatic moiety. Ar groups in formula (20) can be derived from a $C_6$-$C_{30}$ dihydroxyarylene compound, for example a dihydroxyarylene compound of formula (4) or (6) above. Exemplary dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds can also be used.

In another embodiment, polysiloxane blocks are of formula (21)

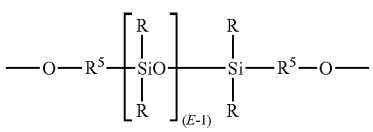
(21)

wherein R and E are as described above, and each $R^5$ is independently a divalent $C_1$-$C_{30}$ organic group, and wherein the polymerized polysiloxane unit is the reaction residue of its corresponding dihydroxy compound. In a specific embodiment, the polysiloxane blocks are of formula (22):

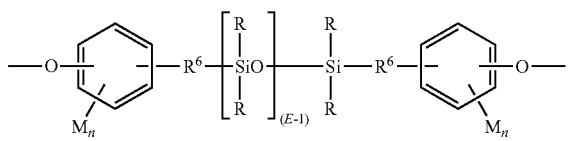
(22)

wherein R and E are as defined above. $R^6$ in formula (22) is a divalent $C_2$-$C_8$ aliphatic group. Each M in formula (22) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^6$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^6$ is a divalent $C_1$-$C_3$ aliphatic group, and R is methyl.

Specific polydiorganosiloxane blocks are of the formula

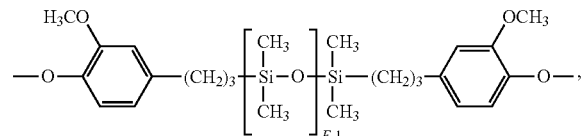

(22a)

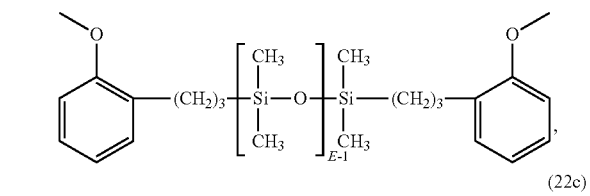

(22b)

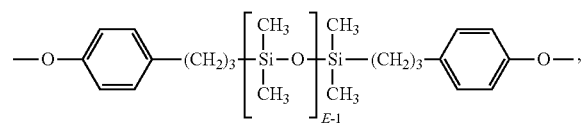

(22c)

or a combination comprising at least one of the foregoing, wherein E has an average value of 2 to 200, 2 to 125, 5 to 125, 5 to 100, 5 to 50, 20 to 80, or 5 to 20.

In an embodiment, locks of formula (19) can be derived from the corresponding dihydroxy polysiloxane (23)

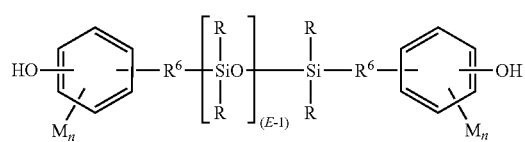

(23)

wherein R, E, M, $R^6$, and n are as described above. Such dihydroxy polysiloxanes can be made by effecting a platinum-catalyzed addition between a siloxane hydride of formula (24)

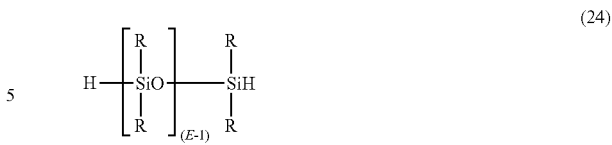

(24)

wherein R and E are as previously defined, and an aliphatically unsaturated monohydric phenol. Exemplary aliphatically unsaturated monohydric phenols include eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Combinations comprising at least one of the foregoing can also be used.

The polysiloxane-polycarbonate copolymer can comprise 50 to 99 weight percent of carbonate units and 1 to 50 weight percent siloxane units. Within this range, the polyorganosiloxane-polycarbonate copolymer can comprise 70 to 98 weight percent, more specifically 75 to 97 weight percent of carbonate units and 2 to 30 weight percent, more specifically 3 to 25 weight percent siloxane units. In an exemplary embodiment, the polysiloxane-polycarbonate copolymer is endcapped with para-cumyl phenol.

In an embodiment, an exemplary polysiloxane-polycarbonate copolymer is a block copolymer having the structure shown in the Formula (25) below:

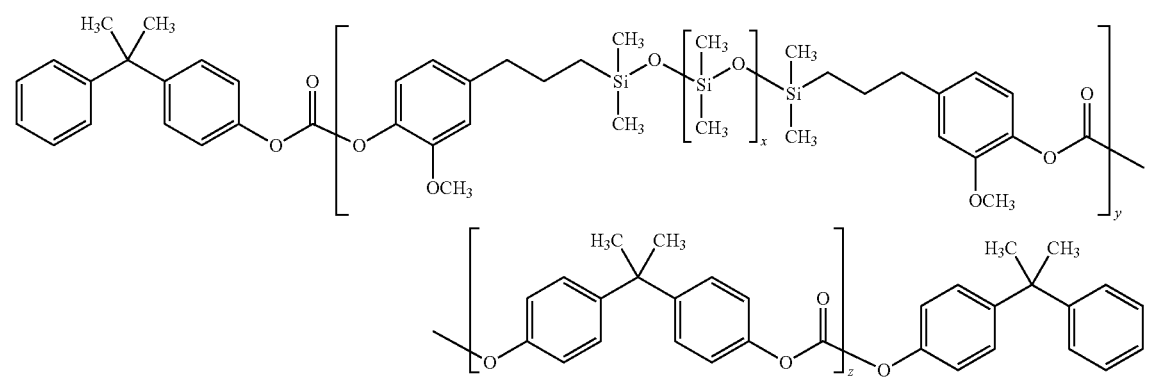

(25)

where the polysiloxane blocks are endcapped with eugenol, where x is 1 to 100, specifically 5 to 85, specifically 10 to 70, specifically 15 to 65, and more specifically 40 to 60. In an embodiment, y is 1 to 90 and z is 1 to 600. The polysiloxane block may be randomly distributed or controlled distributed amongst the polycarbonate blocks. In an embodiment, x is 30 to 50, y is 10 to 30, and z is 450 to 600.

When the polysiloxane polycarbonate copolymer comprises eugenol endcapped polysiloxane, the flame retardant composition comprises 0 to 25 wt % of the polysiloxane-polycarbonate copolymer. The polysiloxane content is 0 to 20 wt %, specifically 1 to 16 wt %, specifically 2 to 14 wt %, and more specifically 3 to 6 wt %, based on the total weight of the polysiloxane-polycarbonate copolymer. In an embodiment, the weight average molecular weight of the polysiloxane block is 29,000 to 30,000 Daltons using gel permeation chromatography with a bisphenol A polycarbonate absolute molecular weight standard.

In an embodiment, the polysiloxane-polycarbonate copolymer comprises 10 wt % or less, specifically 6 wt % or less, and more specifically 4 wt % or less, of the polysiloxane based on the total weight of the polysiloxane-polycarbonate copolymer. Polysiloxane-polycarbonate copolymers containing 10 wt % or less are generally optically transparent and are sometimes referred to as EXL-T as commercially available from SABIC. The transparent polysiloxane-polycarbonate copolymers can be manufactured using one or both of the tube reactor processes described in U.S. Patent Application No. 2004/0039145A1 or the process described in U.S. Pat. No. 6,723,864 may be used to synthesize the polysiloxane-polycarbonate copolymers.

In another embodiment, the polysiloxane-polycarbonate copolymer comprises 10 wt % or more, specifically 12 wt % or more, and more specifically 14 wt % or more, of the polysiloxane based on the total weight of the polysiloxane-polycarbonate copolymer. Polysiloxane-polycarbonate copolymers containing 10 wt % or more polysiloxane are generally optically opaque and are sometimes referred to as EXL-P as commercially available from SABIC. These polysiloxane-polycarbonate copolymers can be manufactured by the methods described in U.S. Pat. No. 6,072,011 to Hoover.

The polysiloxane polycarbonate copolymer can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards.

The polysiloxane polycarbonate copolymer can have a melt volume flow rate, measured at 300° C./1.2 kg, of 1 to 50 cubic centimeters per 10 minutes (cc/10 min), specifically 2 to 30 cc/10 min. Mixtures of polysiloxane polycarbonate copolymer of different flow properties can be used to achieve the overall desired flow property.

The polysiloxane polycarbonate copolymer is present in the flame retardant composition in an amount of 3 to 30 wt %, specifically 6 to 20 wt %, and more specifically 7 to 13 wt %, based on the total weight of the flame retardant composition.

The flame retardant composition may also comprise mineral fillers. In an embodiment, the mineral fillers serve as synergists. The synergist facilitates an improvement in the flame retardant properties when added to the flame retardant composition over a comparative polycarbonate composition that contains all of the same ingredients in the same quantities except for the synergist. Examples of mineral fillers are mica, talc, calcium carbonate, dolomite, wollastonite, barium sulfate, silica, kaolin, feldspar, barytes, or the like, or a combination comprising at least one of the foregoing mineral fillers. The mineral filler may have an average particle size of 0.1 to 20 micrometers, specifically 0.5 to 10 micrometers, and more specifically 1 to 3 micrometers. An exemplary mineral filler it talc having an average particle size of 1 to 3 micrometers.

The mineral filler is present in amounts of 0.1 to 20 wt %, specifically 0.5 to 15 wt %, and more specifically 1 to 5 wt %, based on the total weight of the flame retardant composition.

The flame retardant composition may also optionally contain additives such as antioxidants, antiozonants, stabilizers, thermal stabilizers, mold release agents, dyes, colorants, pigments, flow modifiers, or the like, or a combination comprising at least one of the foregoing additives.

As noted above, the flame retardant composition comprises a flame retarding agent. The flame retarding agent is a phosphazene compound. In an embodiment, the flame retarding agent is a phenoxyphosphazene oligomer.

The phosphazene compound used in the flame retardant composition is an organic compound having a —P═N— bond in the molecule. In an embodiment, the phosphazene compound comprises at least one species of the compound selected from the group consisting of a cyclic phenoxyphosphazene represented by the formula (26) below; a chainlike phenoxyphosphazene represented by the formula (27) below; and a crosslinked phenoxyphosphazene compound obtained by crosslinking at least one species of phenoxyphosphazene selected from those represented by the formulae (26) and (27) below, with a crosslinking group represented by the formula (28):

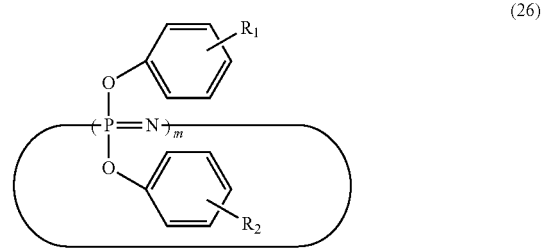

(26)

where in the formula (26), m represents an integer of 3 to 25, $R_1$ and $R_2$ are the same or different and are independently a hydrogen, a hydroxyl, a $C_{7-30}$ aryl group, a $C_{1-12}$ alkoxy, or a $C_{1-12}$ alkyl. A commercially available phenoxyphosphazene having the structure of formula (26) is FP-110® manufactured and distributed by Fushimi Pharmaceutical Co., Ltd.

The chainlike phenoxyphosphazene represented by the formula (27) below:

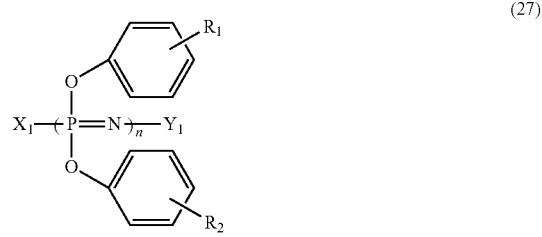

(27)

where in the formula (27), $X^1$ represents a —N═P(OPh)$_3$ group or a —N═P(O)OPh group, $Y^1$ represents a —P(OPh)$_4$ group or a —P(O)(OPh)$_2$ group, n represents an integer from 3 to 10000, Ph represents a phenyl group, $R_1$ and $R_2$ are the same or different and are independently a hydrogen, a halogen, a $C_{1-12}$ alkoxy, or a $C_{1-12}$ alkyl.

The phenoxyphosphazenes may also have a crosslinking group represented by the formula (28) below:

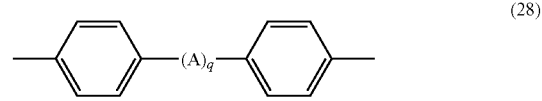

(28)

where in the formula (18), A represents —C(CH$_3$)$_2$—, —SO$_2$—, —S—, or —O—, and q is 0 or 1.

In an embodiment, the phenoxyphosphazene compound has a structure represented by the formula (29)

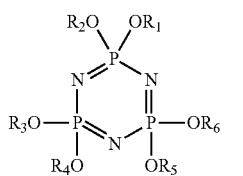

(29)

where $R_1$ to $R_6$ can be the same of different and can be an aryl group, an aralkyl group, a $C_{1-12}$ alkoxy, a $C_{1-12}$ alkyl, or a combination thereof.

In an embodiment, the phenoxyphosphazene compound has a structure represented by the formula (30)

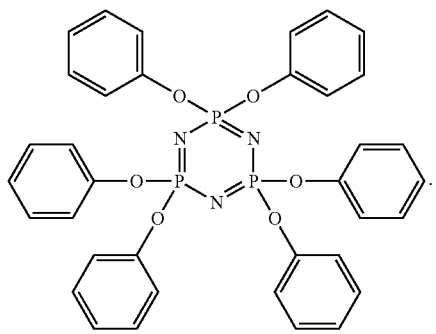

(30)

The aforementioned phenoxyphosphazenes are commercially available as SPB-100®, manufactured and distributed by Otsuka Chemical Co., Ltd, LY202®, manufactured and distributed by Lanyin Chemical Co., Ltd or FP-110®, manufactured and distributed by Fushimi Pharmaceutical Co., Ltd.

The cyclic phenoxyphosphazene compound represented by the formula (26) may be exemplified by compounds such as phenoxy cyclotriphosphazene, octaphenoxy cyclotetraphosphazene, and decaphenoxy cyclopentaphosphazene, obtained by allowing ammonium chloride and phosphorus pentachloride to react at 120 to 130° C. to obtain a mixture containing cyclic and straight chain chlorophosphazenes, extracting cyclic chlorophosphazenes such as hexachloro cyclotriphosphazene, octachloro cyclotetraphosphazene, and decachloro cyclopentaphosphazene, and then substituting it with a phenoxy group. The cyclic phenoxyphosphazene compound may be a compound in which m in the formula (26) represents an integer of 3 to 8.

The chainlike phenoxyphosphazene compound represented by the formula (27) is exemplified by a compound obtained by subjecting hexachloro cyclotriphosphazene, obtained by the above-described method, to ring-opening polymerization at 220 to 250° C., and then substituting thus obtained chainlike dichlorophosphazene having a degree of polymerization of 3 to 10000 with phenoxy groups. The chain-like phenoxyphosphazene compound has a value of n in the formula (27) of 3 to 1000, specifically 5 to 100, and more specifically 6 to 25.

The crosslinked phenoxyphosphazene compound may be exemplified by compounds having a crosslinked structure of a 4,4'-diphenylene group, such as a compound having a crosslinked structure of a 4,4'-sulfonyldiphenylene (bisphenol S residue), a compound having a crosslinked structure of a 2,2-(4,4'-diphenylene) isopropylidene group, a compound having a crosslinked structure of a 4,4'-oxydiphenylene group, and a compound having a crosslinked structure of a 4,4'-thiodiphenylene group. The phenylene group content of the crosslinked phenoxyphosphazene compound is generally 50 to 99.9 wt %, and specifically 70 to 90 wt %, based on the total number of phenyl group and phenylene group contained in the cyclic phosphazene compound represented by the formula (26) and/or the chainlike phenoxyphosphazene compound represented by the formula (27). The crosslinked phenoxyphosphazene compound may be particularly preferable if it doesn't have any free hydroxyl groups in the molecule thereof. In an exemplary embodiment, the phosphazene compound comprises the cyclic phosphazene.

It is desirable for the flame retardant composition to comprise the phosphazene compound in an amount of 1 to 20 wt %, specifically 2 to 16 wt %, and more specifically 2.5 wt % to 14 wt %, based on the total weight of the flame retardant composition.

The thermoplastic composition can further include impact modifier(s). These impact modifiers include elastomer-modified graft copolymers comprising (i) an elastomeric (i.e., rubbery) polymer substrate having a Tg less than or equal to 10° C., more specifically less than or equal to −10° C., or more specifically −40° to −80° C., and (ii) a rigid polymeric superstrate grafted to the elastomeric polymer substrate. As is known, elastomer-modified graft copolymers can be prepared by first providing the elastomeric polymer, then polymerizing the constituent monomer(s) of the rigid phase in the presence of the elastomer to obtain the graft copolymer. The grafts can be attached as graft branches or as shells to an elastomer core. The shell can merely physically encapsulate the core, or the shell can be partially or essentially completely grafted to the core.

Materials for use as the elastomer phase include, for example, conjugated diene rubbers; copolymers of a conjugated diene with less than or equal to 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Conjugated diene monomers for preparing the elastomer phase include those of formula (31)

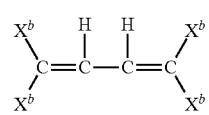

(31)

wherein each $X^b$ is independently hydrogen, $C_1$-$C_5$ alkyl, or the like. Examples of conjugated diene monomers that can be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as combinations comprising at least one of the foregoing conjugated diene monomers. Specific conjugated diene homopolymers include polybutadiene and polyisoprene.

Copolymers of a conjugated diene rubber can also be used, for example those produced by aqueous radical emulsion polymerization of a conjugated diene and at least one monomer copolymerizable therewith. Monomers that are useful for copolymerization with the conjugated diene include monovinylaromatic monomers containing condensed aromatic ring structures, such as vinyl naphthalene, vinyl anthracene, and the like, or monomers of formula (32)

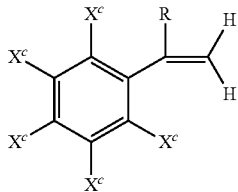

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. monovinylaromatic monomers that can be used include styrene, 3-methylstyrene, 3,5-diethylstyrene, 4-n-propylstyrene, alpha-methylstyrene, alpha-methyl vinyltoluene, alpha-chloro styrene, alpha-bromostyrene, dichlorostyrene, dibromostyrene, tetra-chlorostyrene, and the like, and combinations comprising at least one of the foregoing compounds. Styrene and/or alpha-methylstyrene can be used as monomers copolymerizable with the conjugated diene monomer.

Other monomers that can be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (33)

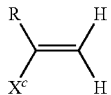

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (32) include acrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Combinations of the foregoing monovinyl monomers and monovinylaromatic monomers can also be used.

(Meth)acrylate monomers for use in the elastomeric phase can be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers can optionally be polymerized in admixture with less than or equal to 15 wt % of comonomers of formulas (31), (32), or (33), based on the total monomer weight. comonomers include but are not limited to butadiene, isoprene, styrene, methyl methacrylate, phenyl methacrylate, phenethylmethacrylate, N-cyclohexylacrylamide, vinyl methyl ether or acrylonitrile, and combinations comprising at least one of the foregoing comonomers. Optionally, less than or equal to 5 wt % of a polyfunctional crosslinking comonomer can be present, based on the total monomer weight. Such polyfunctional crosslinking comonomers can include, for example, divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase can be polymerized by mass, emulsion, suspension, solution or combined processes such as bulk-suspension, emulsion-bulk, bulk-solution or other techniques, using continuous, semi-batch, or batch processes. The particle size of the elastomer substrate is not critical. For example, an average particle size of 0.001 to 25 micrometers, specifically 0.01 to 15 micrometers, or even more specifically 0.1 to 8 micrometers can be used for emulsion based polymerized rubber lattices. A particle size of 0.5 to 10 micrometers, specifically 0.6 to 1.5 micrometers can be used for bulk polymerized rubber substrates. Particle size can be measured by simple light transmission methods or capillary hydrodynamic chromatography (CHDF). The elastomer phase can be a particulate, moderately cross-linked conjugated butadiene or $C_{4-6}$ alkyl acrylate rubber, and specifically has a gel content greater than 70%. Also useful are combinations of butadiene with styrene and/or $C_{4-6}$ alkyl acrylate rubbers.

The elastomeric phase comprises 5 to 95 wt % of the total graft copolymer, more specifically 20 to 90 wt %, and even more specifically 40 to 85 wt % of the elastomer-modified graft copolymer, the remainder being the rigid graft phase.

The rigid phase of the elastomer-modified graft copolymer can be formed by graft polymerization of a combination comprising a monovinylaromatic monomer and optionally at least one comonomer in the presence of at least one elastomeric polymer substrates. The above-described monovinylaromatic monomers of formula (18) can be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Useful comonomers include, for example, the above-described monovinylic monomers and/or monomers of the general formula (17). In an embodiment, R is hydrogen or $C_1$-$C_2$ alkyl, and $X^c$ is cyano or $C_1$-$C_{12}$ alkoxycarbonyl. comonomers for use in the rigid phase include acrylonitrile, methacrylonitrile, methyl (meth)acrylate, ethyl (meth)acrylate, n-propyl (meth)acrylate, isopropyl (meth)acrylate, and the like, and combinations comprising at least one of the foregoing comonomers.

The relative ratio of monovinylaromatic monomer and comonomer in the rigid graft phase can vary widely depending on the type of elastomer substrate, type of monovinylaromatic monomer(s), type of comonomer(s), and the desired properties of the impact modifier. The rigid phase can generally comprise less than or equal to 100 wt % of monovinyl aromatic monomer, specifically 30 to 100 wt %, more specifically 50 to 90 wt % monovinylaromatic monomer, with the balance of the rigid phase being comonomer(s).

Depending on the amount of elastomer-modified polymer present, a separate matrix or continuous phase of ungrafted rigid polymer or copolymer can be simultaneously obtained along with the elastomer-modified graft copolymer. Typically, such impact modifiers comprise 40 to 95 wt % elastomer-modified graft copolymer and 5 to 65 wt % graft copolymer, based on the total weight of the impact modifier. In another embodiment, such impact modifiers comprise 50 to 85 wt %, more specifically 75 to 85 wt % rubber-modified graft copolymer, together with 15 to 50 wt %, more specifically 15 to 25 wt % graft copolymer, based on the total weight of the impact modifier.

In an embodiment, the aromatic vinyl copolymer comprises "free" styrene-acrylonitrile copolymer (SAN), i.e., styrene-acrylonitrile copolymer that is not grafted onto another polymeric chain. In a particular embodiment, the free styrene-acrylonitrile copolymer can have a molecular weight of 50,000 to 200,000 Daltons on a polystyrene standard molecular weight scale and can comprise various proportions of styrene to acrylonitrile. For example, free SAN can comprise 75 weight percent styrene and 25 weight percent acrylonitrile based on the total weight of the free SAN copolymer. Free SAN can optionally be present by virtue of the addition of a grafted rubber impact modifier in the composition that contains free SAN, and/or free SAN can by present independent of other impact modifiers in the composition.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched alkyl group and $R^e$ is a branched $C_3$-$C_{16}$ alkyl group; a first graft link monomer; a polymerizable alkenyl-containing organic material; and a second graft link monomer. The silicone rubber monomer can comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Branched acrylate rubber monomers include iso-octyl acrylate, 6-methyloctyl acrylate, 7-methyloctyl acrylate, 6-methylheptyl acrylate, and the like, or a combination comprising at least one of the foregoing. The polymerizable alkenyl-containing organic material can be, for example, a monomer of formula (18) or (19), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The first graft link monomer can be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The second graft link monomer is a polyethylenically unsaturated compound having at least one allyl group, such as allyl methacrylate, triallyl cyanurate, triallyl isocyanurate, and the like, or a combination comprising at least one of the foregoing.

The silicone-acrylate impact modifiers can be prepared by emulsion polymerization, wherein, for example a silicone rubber monomer is reacted with a first graft link monomer at a temperature from 30 to 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate can be reacted with a first graft link monomer such as (gamma-methacryloxypropyl)methyldimethoxysilane. A branched acrylate rubber monomer is then polymerized with the silicone rubber particles, optionally in presence of a cross linking monomer, such as allyl methacrylate, in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid can be separated from the aqueous phase through coagulation (by treatment with a coagulant) and dried to a fine powder to produce the silicone-acrylate rubber impact modifier. This method can be generally used for producing the silicone-acrylate impact modifier having a particle size of 100 nanometers to 2 micrometers.

Processes known for the formation of the foregoing elastomer-modified graft copolymers include mass, emulsion, suspension, and solution processes, or combined processes such as bulk-suspension, emulsion-bulk, bulk-solution, or other techniques, using continuous, semi-batch, or batch processes.

In an embodiment the foregoing types of impact modifiers are prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and can catalyze transesterification and/or degradation of polycarbonates. Instead, ionic sulfate, sulfonate, or phosphate surfactants can be used in preparing the impact modifiers, particularly the elastomeric substrate portion of the impact modifiers. Useful surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, or a combination comprising at least one of the foregoing. A specific surfactant is a $C_{6-16}$, specifically a $C_{8-12}$ alkyl sulfonate. This emulsion polymerization process is described and disclosed in various patents and literature of such companies as Rohm & Haas and General Electric Company. In the practice, any of the above-described impact modifiers can be used providing it is free of the alkali metal salts of fatty acids, alkali metal carbonates and other basic materials.

A specific impact modifier of this type is a methyl methacrylate-butadiene-styrene (MBS) impact modifier wherein the butadiene substrate is prepared using above-described sulfonates, sulfates, or phosphates as surfactants. Other examples of elastomer-modified graft copolymers in addition to ABS and MBS include but are not limited to acrylonitrile-styrene-butyl acrylate (ASA), methyl methacrylate-butadiene (MB), methyl methacrylate-acrylonitrile-butadiene-styrene (MABS), and acrylonitrile-ethylene-propylene-diene-styrene (AES).

Impact modifiers are generally present in amounts of 1 to 30 wt %, specifically 3 to 25 wt %, and more specifically 4 to 20 wt %, based on the total weight of the polymers in the flame retardant composition. An exemplary impact modifier comprises an acrylic polymer in an amount of 2 to 15 wt %, specifically 3 to 12 wt %, based on the total weight of the flame retardant composition.

The flame retardant composition may also contain pentaerythritol tetrastearate in amounts of 0.01 to 2.0 wt %, based on the total weight of the flame retardant composition.

In an embodiment, the flame retardant composition may comprise an anti-drip agent. Fluorinated polyolefin and/or polytetrafluoroethylene may be used as an anti-drip agent.

Anti-drip agents may also be used, for example a fibril forming or non-fibril forming fluoropolymer such as polytetrafluoroethylene (PTFE). The anti-drip agent may be encapsulated by a rigid copolymer such as, for example styrene acrylonitrile (SAN). PTFE encapsulated in SAN is known as TSAN. Encapsulated fluoropolymers may be made by polymerizing the encapsulating polymer in the presence of the fluoropolymer, for example, in an aqueous dispersion. TSAN may provide significant advantages over PTFE, in that TSAN may be more readily dispersed in the composition. A suitable TSAN may comprise, for example, 50 wt % PTFE and 50 wt % SAN, based on the total weight of the encapsulated fluoropolymer. The SAN may comprise, for example, 75 wt % styrene and 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer.

The anti-drip agent may be added in the form of relatively large particles having a number average particle size of 0.3 to 0.7 mm, specifically 0.4 to 0.6 millimeters. The anti-drip agent may be used in amounts of 0.01 wt % to 5.0 wt %, specifically 0.1 to 1.0 wt %, and more specifically 0.2 to 0.8 wt %, based on the total weight of the flame retardant composition.

Other additives such as anti-oxidants, anti-ozonants, mold release agents, thermal stabilizers, levelers, viscosity modifying agents, free-radical quenching agents, other polymers or copolymers such as impact modifiers, or the like.

The preparation of the flame retardant composition can be achieved by blending the ingredients under conditions that produce an intimate blend. All of the ingredients can be added initially to the processing system, or else certain additives can be precompounded with one or more of the primary components.

In an embodiment, the flame retardant composition is manufactured by blending the polycarbonate composition with the phosphazene compound and the impact modifier. The blending can be dry blending, melt blending, solution blending, or a combination comprising at least one of the foregoing forms of blending.

In an embodiment, the flame retardant composition can be dry blended to form a mixture in a device such as a Henschel mixer or a Waring blender prior to being fed to an extruder, where the mixture is melt blended. In another embodiment, a portion of the polycarbonate composition can be premixed with the phosphazene compound to form a dry preblend. The dry preblend is then melt blended with the remainder of the polycarbonate composition in an extruder. In an embodiment, some of the flame retardant composition can be fed initially at the mouth of the extruder while the remaining portion of the flame retardant composition is fed through a port downstream of the mouth.

Blending of the flame retardant composition involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing.

Blending involving the aforementioned forces may be conducted in machines such as single or multiple screw extruders, Buss kneader, Henschel, helicones, Ross mixer, Banbury, roll mills, molding machines such as injection molding machines, vacuum forming machines, blow molding machine, or then like, or combinations comprising at least one of the foregoing machines.

The flame retardant composition can be introduced into the melt blending device in the form of a masterbatch. For example, a portion of the polycarbonate composition can be pre-blended with the phosphazene flame retardant to form a masterbatch, which is then blended with the remaining ingredients to form the flame retardant composition. In such a process, the masterbatch may be introduced into the blending device downstream of the point where the remaining ingredients of the flame retardant composition are introduced.

In an embodiment, the flame retardant composition disclosed herein is used to prepare molded articles such as for example, durable articles, electrical and electronic components, automotive parts, and the like. The compositions can be converted to articles using common thermoplastic processes such as film and sheet extrusion, injection molding, gas-assisted injection molding, extrusion molding, compression molding and blow molding.

In an embodiment, the flame retardant compositions when prepared into test specimens having a thickness of at least 1.2 mm, exhibit a flammability class rating according to Underwriters Laboratories Inc. UL-94 of at least V-2, more specifically at least V-1, and yet more specifically at least V-0. In another embodiment, the flame retardant compositions when prepared into specimens having a thickness of at least 2.0 millimeters, exhibit a flammability class rating according to Underwriters Laboratories Inc. UL-94 of at least V-2, more specifically at least V-1, and yet more specifically at least V-0.

Flammability tests were performed following the procedure of Underwriter's Laboratory Bulletin 94 entitled "Tests for Flammability of Plastic Materials, UL 94". Several ratings can be applied based on the rate of burning, time to extinguish, ability to resist dripping, and whether or not drips are burning. Samples for testing are bars having dimensions of 125 mm length×13 mm width by no greater than 13 mm thickness. Bar thicknesses were 0.6 mm or 0.8 mm. Materials can be classified according to this procedure as UL 94 HB (horizontal burn), V0, V1, V2, 5VA and/or 5VB on the basis of the test results obtained for five samples; however, the compositions herein were tested and classified only as V0, V1, and V2, the criteria for each of which are described below.

V0: In a sample placed so that its long axis is 180 degrees to the flame, the period of flaming and/or smoldering after removing the igniting flame does not exceed ten (10) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 50 seconds.

V1: In a sample placed so that its long axis is 180 degrees to the flame, the period of flaming and/or smoldering after removing the igniting flame does not exceed thirty (30) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 250 seconds.

V2: In a sample placed so that its long axis is 180 degrees to the flame, the average period of flaming and/or smoldering after removing the igniting flame does not exceed thirty (30) seconds, but the vertically placed samples produce drips of burning particles that ignite cotton. Five bar flame out time is the flame out time for five bars, each lit twice, in which the sum of time to flame out for the first (t1) and second (t2) ignitions is less than or equal to a maximum flame out time (t1+t2) of 250 seconds.

In an embodiment, the flame retardant compositions are of particular utility in the manufacture flame retardant articles that pass the UL94 vertical burn tests, in particular the UL94 5VB standard. In the UL94 vertical burn test, a flame is applied to a vertically fastened test specimen placed above a cotton wool pad. To achieve a rating of 5VB, burning must stop within 60 seconds after five applications of a flame to a test bar, and there can be no drips that ignite the pad. Various embodiments of the compositions described herein meet the UL94 5VB standard.

A VXTOOL test is used to estimate p(FTP), i.e., the probability for a first time pass when subjected to a flame. In the VXTOOL test, 20 flame bars are burnt as per UL94 test protocols and the flame data is analyzed to estimate the p(FTP) values. The p(FTP) value can range between 0 and 1 and indicates the probability that the first five bars when tested for V-0 or V-1 UL94 test would pass. A higher p(FTP) value indicates the greater likelihood of passing and therefore an improved flame retardancy. Thus, a VXTOOL p(FTP)V-0 of 1.0 signifies a very high confidence/probability of attaining the V-0 flame rating, whereas a p(FTP)V-0 of 0.0 indicates a very poor probability of attaining the V-0 flame rating.

Izod Impact Strength is used to compare the impact resistances of plastic materials. Notched Izod impact strength was determined at both 23° C. and 0° C. using a 3.2-mm thick, molded, notched Izod impact bar. It was determined per ASTM D256. The results are reported in Joules per meter. Tests were conducted at room temperature (23° C.) and at a low temperature (−40° C.).

Heat deflection temperature (HDT) is a relative measure of a material's ability to perform for a short time at elevated temperatures while supporting a load. The test measures the effect of temperature on stiffness: a standard test specimen is given a defined surface stress and the temperature is raised at a uniform rate. HDT was determined as flatwise under 1.82 MPa loading with 3.2 mm and/or 6.4 mm thickness bar according to ASTM D648. Results are reported in ° C.

The flame retardant composition displays an advantageous combination of properties such as ductility, melt processability, impact strength, and flame retardancy.

The following examples, which are meant to be exemplary, not limiting, illustrate the flame retardant compositions and methods of manufacturing of some of the various embodiments of the flame retardant compositions described herein.

EXAMPLE

Example 1

This example was conducted to demonstrate the disclosed composition and the method of manufacturing a flame retardant composition that comprises the polycarbonate composition, a phosphazene flame retardant and an impact modifier. The polycarbonate comprises a blend of bisphenol A (BPA) polycarbonate manufactured by an interfacial process with a weight average molecular weight of about 22,000 on an absolute polycarbonate molecular weight scale (referred to as PC1) and a BPA polycarbonate manufactured by an interfacial process with a weight average molecular weight of about 30,000 on an absolute PC molecular weight scale (referred to as PC2). The polycarbonate resins used in this example are shown below in the Table 1. The molecular weight specified is a weight average molecular weight as determined using a polycarbonate standard.

Table 1 lists ingredients used in the following examples along with a brief description of these ingredients. Table 2 lists the compounding conditions in the extruder, while Table 3 lists the compounding conditions in the molding machine. Table 4 lists comparative compositions along with compositions of the disclosure.

TABLE 1

| Ingredient | Description |
|---|---|
| PC1 | BPA polycarbonate resin made by an interfacial process with a weight average molecular weight of about 22,000 on an absolute PC molecular weight scale |
| PC2 | BPA polycarbonate resin made by an interfacial process with a weight average molecular weight of about 30,000 on an absolute PC molecular weight scale |
| PC3 | Bisphenol A polycarbonate-polysiloxane copolymer comprising about 20% by weight of siloxane, 80% by weight BPA and endcapped with para-cumyl phenol with Mw target = 28500-30000 grams per mole. |
| PC4 | 35 mole % PPPBP, Mw = 23,000 grams per mole with a polydispersity index (PDI) of about 2.2 and melt flow rate at 330° C./2.6 kg of about 20 g/10 min, Molecular weight range = 22,000 to 23,700 grams per mole |
| PC5 | 89 mol % BisAP, Mw = 23,000 grams per mole with PDI of about 2.2, melt flow rate at 330° C./2.6 kg of about 28 g/10 min molecular weight range = 19,000 to 25,000 grams per mol |
| Bulk ABS resin | Acrylonitrile-butadiene-styrene impact modifier having acrylonitrile = 15 mole percent, butadiene = 16 weight percent and styrene = 69 weight percent. |
| Emulsion ABS | Acrylonitrile-butadiene-styrene impact modifier from SABIC, acrylonitrile = 11.1 weight percent, butadiene = 50.4 weight percent and styrene = 38.5 weight percent |
| MB resin | Methyl methacrylate-butadiene core-shell type impact modifier made by Dow Chemical Co. and sold under the trade name EXL2650A. |
| SAN | Styrene-Acrylonitrile copolymer with acrylonitrile = 25 weight percent |
| TSAN | SAN encapsulated PTFE - intermediate resin |
| Talc | Fine Talc with Luzenac product no. Jetfine 3 C A |
| Phenoxyphosphazene | Phenoxyphosphazene with FUSHIMI product no. Rabitle ® FP-110 |
| Phenoxyphosphazene | SPB-100 ® manufactured by Otsuka Chemical Co., Ltd. |
| Phosphate polymeric retardant | FRX-100 |
| BPADP | Bisphenol A bis(diphenyl phosphate) with Nagase product no. CR741 |

TABLE 1-continued

| Ingredient | Description |
| --- | --- |
| KSS | Potassium diphenyl sulfone |
| PETS | Pentaerythritol tetrastearate |
| Antioxidant 1 | Mono zinc phosphate with Budenheim product no. Z21-82 |
| Antioxidant 2 | Hindered Phenol Antioxidant with Ciba product no. Irganox 1076 |
| Antioxidant 3 | Tris(2,4-di-tert-butylphenyl)phosphite with Ciba product no. IRGAFOS 168 |
| Antioxidant 4 | 2-(2'hydroxy-5-T-octylphenyl)-benzotriazole with Ciba product no. Tinuvin 329 |
| Metal deactivator | 2,2'-oxalyldiamidobis[ethyl 3-(3,5-di-tert-butyl-4-hydroxyphenyl)propionate] with Chemtura product no. Naugard XL-1 |
| Chain Extender | Modified acrylic copolymer with BASF product no. Joncryl* ADR 4368 |

Extrusion was carried out on a WERNER & PFLEIDERER 30 mm co-rotating twin screw extruder. The feed throat feeds the powder blends into the line before the Zone 1. At Zone 4, a vacuum vent is attached to the line and at Zone 5 a liquid injection system is attached via which the liquid flame retardants were injected. Typical temperature profile and processing conditions employed are shown in Table 2 below. Table 3 depicts the molding conditions. All the components were fed from main throat from upper stream. The impact modifiers and the phenoxyphosphazene were pre-blended with the polycarbonate powder in a super blender and then fed into the extruder. The various compositions along with the properties are detailed in the Table 4. The test standards used for the property measurements are detailed in the respective property tables.

TABLE 2

| Parameters | Unit of Measure | Set value |
| --- | --- | --- |
| Zone 1 temperature | ° F. | 350 |
| Zone 2 temperature | ° F. | 450 |
| Zone 3 temperature | ° F. | 500 |
| Zone 4 temperature | ° F. | 575 |
| Zone 5 temperature | ° F. | 575 |
| Zone 6 temperature | ° F. | 575 |
| Zone 7 (Die Head) temperature | ° F. | 575 |
| Screw speed | RPM | 300 to 500 |
| Torque | % | 40 to 90 |
| Throughput | kg/h | 25 to 60 |

Table 3 below shows the molding conditions. The various test parts were injection molded on various machines such as Van Dorn 85HT3, Van Dorn 170HT6, Husky G160RS42/30, Van Dorn 120HT5, and Van Dorn 260H-RS-14. Given below are the typical molding conditions.

TABLE 3

| | Unit of Measure | Settings |
| --- | --- | --- |
| Drying temperature | ° C. | 75 to 90 |
| Drying time | hours | 3 to 4 |
| Melt temperature | ° C. | 240 to 275 |
| Nozzle temperature | ° C. | 240 to 275 |
| Front - Zone 3 temperature | ° C. | 240 to 275 |
| Middle - Zone 2 temperature | ° C. | 210 to 275 |
| Rear - Zone 1 temperature | ° C. | 210 to 255 |
| Mold Temperature | ° C. | 60 to 170 |
| Back pressure | MPa | 0.3 to 0.7 |
| Screw speed | RPM | 40 to 100 |

The compositions were all compounded from twin-screw extruder, and the pellets were collected for evaluation and molding. The ASTM standard molded parts were evaluated accordingly to the standards for flexural, tensile, notched Izod and multi axial impact.

Table 4 below details some comparative flame retardant compositions along with the mechanical and flame retardant properties. The compositions and properties are shown in the following tables.

Notched Izod tests were conducted as per ASTM D 256. Tensile testing was conducted at a rate of 5 millimeters per minute as per ASTM D638. The heat distortion temperature was measured at 1.82 MPa on bars having a thickness of 3.2 millimeters or 6.4 millimeters as per ASTM D 648. The probability of a first time pass p(FTP) was determined for a flame retardancy of V-0 and V-1 as per UL-94 protocols on bars having a thickness of 0.6 millimeters to 1.5 millimeters as can be seen in the tables below. Table 1 shows the formulations in which BPADP was progressively replaced at 50% and 100% of its loading with SPB-100 in the flame retardant compositions. Sample #1 contains no SPB-100 and therefore serves as a control (i.e., a comparative sample) for this set of samples.

The compositions are shown in the Table 4 below. In Table 4 it can be seen that Sample #1 contains a comparative flame retardant BPADP, while Sample #s 2 and 3 contains the phosphazene.

TABLE 4

| Item Description | Unit | Sample #1* | Sample #2 | Sample #3 |
| --- | --- | --- | --- | --- |
| PC1 | wt % | 65.82 | 65.82 | 65.82 |
| PC2 | wt % | 5.72 | 5.72 | 5.72 |
| PC3 | wt % | 14 | 14 | 14 |
| Bisphenol A bis(diphenyl phosphate) | wt % | 10 | 5 | |
| SPB-100 Flame Retardant | wt % | | 5 | 10 |
| Bulk ABS RESIN | wt % | 3 | 3 | 3 |
| PHOSPHITE STABILIZER | wt % | 0.08 | 0.08 | 0.08 |
| PENTAERYTHRITOL TETRASTEARATE | wt % | 0.3 | 0.3 | 0.3 |
| HINDERED PHENOL ANTI-OXIDANT | wt % | 0.08 | 0.08 | 0.08 |
| SAN encapsulated PTFE - intermediate resin | wt % | 1 | 1 | 1 |

*Comparative Sample

Table 5 shows the properties for the compositions of Table 4.

TABLE 5

| Test No. | Test | Quantity/Unit | Condition | Sample #1* | Sample #2 | Sample #3 |
|---|---|---|---|---|---|---|
| 1 | MVR ASTM D 1238 | cm³/10 min | 260° C./2.16 KG/ 360 s | 17.3 | 22.3 | 18.1 |
| | | | 260° C./2.16 KG/ 1080 s | — | 28.2 | 19.1 |
| 2 | HDT ASTM D 648 | ° C. | 1.8 MPa/3.2 mm | 88.3 | 90.4 | 96.8 |
| 3 | Notched Izod ASTM D256 | Impact Strength, J/m Ductility (%) Impact Strength, J/m Ductility (%) | 23° C./5 lbf/ft  0° C./5 lbf/ft | 507 60 89.2 0 | 793 100 112 0 | 913 100 809 100 |
| 4 | Multi-axial Impact ASTM D3763 | Total energy (J) Ductility (%) Total energy (J) Ductility (%) | 23° C./3.6 m/s/ 3.2 mm 0° C./3.6 m/s/ 3.2 mm | 70.7 100 61 100 | 67.6 100 64 100 | 65.2 100 65.5 100 |

Table 5 shows the properties obtained for the samples shown in Table 4. As the data indicates, significant property enhancements were observed in notched Izod impact strength (from about 507 J/m for Sample #1 to over 910 J/m for Sample #3) and HDT (from 88° C. for Sample #1 to 97° C. for Sample #3) while maintaining reasonable flow (~18 cm³/10 min) as BPADP was replaced with SPB-100. In addition, Sample #3 (with 10% SPB-100) also showed a notched Izod impact strength of greater than 800 J/m at 0° C. thereby allowing for PC/ABS blends with low temperature ductility at high HDT. Sample #s 1, 2, and 3 showed a ductile failure with good impact strength in the multi-axial impact test at both 23° C. and 0° C.

Tables 6 also shows the flame performance of the samples shown in Table 4. The flame performance has been observed through the following parameters:
(i) average of second ($t_2$) flame-out time (FOT),
(ii) average of first ($t_1$) and second ($t_2$) FOT, under UL94 protocols. Based on the data shown in Table 2, the flame performance is seen to improve significantly as BPADP is replaced with SPB-100. The average FOTs decrease indicating an improvement in the flame out time. Based on UL-94, while Sample #1 did not have any rating, a V-0 rating is obtained for Sample #s 2 and 3 at 0.6 mm. The progressively increasing p(FTP) values for Sample #1, Sample #2, and Sample #3 also indicate an improvement in flame retardant properties in that order with Sample #3 being the best flame retardant sample.

From the Tables 5 and 6, it may be seen that while conventional oligophosphate flame retardants like BPADP and RDP improve the flame performance, they decrease the impact strength and HDT severely. However, SPB-100 permits an improvement in flame performance over BPADP, and in addition improves impact strength and HDT.

TABLE 6

| Test No. | Test | Quantity/Unit | Condition | Sample #1* | Sample #2 | Sample #3 |
|---|---|---|---|---|---|---|
| 5 | UL94 Vertical flame test | p(FTP), V-0 | 0.75 mm | — | 0.46 | 0.7 |
| | | p(FTP), V-1 | 23° C./48 h | — | 0.46 | 0.7 |
| | | FOT (Avg of $t_2$), s | | — | 2.43 | 1.8 |
| | | FOT (Avg of all $t_1$ and $t_2$), s | | — | 1.89 | 1.06 |
| | | p(FTP), V-0 | 0.75 mm | — | 1 | 1 |
| | | p(FTP), V-1 | 70° C./168 h | — | 1 | 1 |
| | | FOT (Avg of $t_2$), s | | — | 1.77 | 1.63 |
| | | FOT (Avg of all $t_1$ and $t_2$), s | | — | 1.34 | 1.18 |
| | | p(FTP), V-0 | 0.6 mm | 0.20 | 0.7 | 1 |
| | | p(FTP), V-1 | 23° C./48 h | 1 | 0.7 | 1 |
| | | FOT (Avg of $t_2$), s | | — | 1.42 | 1.29 |
| | | FOT (Avg of all $t_1$ and $t_2$), s | | — | 0.99 | 0.8 |
| | | p(FTP), V-0 | 0.6 mm | 0.03 | 1 | 1 |
| | | p(FTP), V-1 | 70° C./168 h | 0.03 | 1 | 1 |
| | | FOT (Avg of $t_2$), s | | 1.01 | 0.73 | 0.99 |
| | | FOT (Avg of all $t_1$ and $t_2$), s | | 1.05 | 0.98 | 0.93 |

(iii) Rating (based on first 5 bars),
(iv) probability of first time pass for 5 bars, p(FTP) values.

The p(FTP) values include the FOTs and the burning characteristics to estimate the probability that the first five bars will pass the specified rating if tested under UL94 protocols. Thus p(FTP) ranges between 0 and 1 with higher value indicating a higher likelihood of passing a particular rating.

Table 6 shows the flame performance of 0.75 mm and 0.6 mm flame bars of Sample #s 1, 2, and 3 in vertical testing Example 2

This example contains almost all of the same ingredients used in the Example 1 with the exception of the phosphazene flame retardant. In this particular case, the flame retardant was FRX-110.

The FRX-100 has the polymeric phosphate flame retardant has the structure shown in the formula (30a)

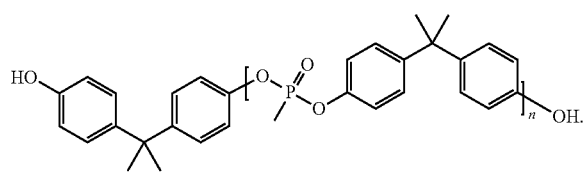

(30a)

The sample was processed in the same manner as in the Example 1. Table 7 shows the various compositions. Table 7 shows the formulations in which FRX-100 has been incorporated in the polycarbonate composition (i.e., 20 wt % polysiloxane-carbonate copolymer containing polycarbonate impact modified with ABS). Sample #4 contains no FRX-100 and therefore serves as a control for this set of samples. Sample #5 contains 8.3 wt % FRX-100 which is equivalent in its phosphorous content to 10 wt % BPADP contained in Sample #4. Sample #6 contains even higher FRX-100 and Sample #7 contains FRX-100 on top of the 10 wt % BPADP contained in Sample #4.

TABLE 7

| Item Description | Unit | Sample #4 | Sample #5 | Sample #6 | Sample #7 |
|---|---|---|---|---|---|
| PC1 | wt % | 65.82 | 67.336 | 65.82 | 60.82 |
| PC2 | wt % | 5.72 | 5.852 | 5.72 | 5.72 |
| PC3 | wt % | 14 | 14 | 14 | 14 |
| BPADP | wt % | 10 | | | 10 |
| FRX-100 | wt % | | 8.3 | 10 | 5 |
| Bulk ABS | wt % | 3 | 3 | 3 | 3 |
| Phosphite stabilizer | wt % | 0.08 | 0.08 | 0.08 | 0.08 |
| PETS | wt % | 0.3 | 0.3 | 0.3 | 0.3 |

TABLE 7-continued

| Item Description | Unit | Sample #4 | Sample #5 | Sample #6 | Sample #7 |
|---|---|---|---|---|---|
| Hindered phenol antioxidant | wt % | 0.08 | 0.08 | 0.08 | 0.08 |
| TSAN | wt % | 1 | 1 | 1 | 1 |

The properties are shown in the Table 8 below.

TABLE 8

| Test No. | Test | Quantity/Unit | Condition | Sample #4 | Sample #5 | Sample #6 | Sample #7 |
|---|---|---|---|---|---|---|---|
| 1 | MVR ASTM D 1238 | cm$^3$/10 min | 260° C./2.16 KG/360 s | 17.3 | 12.8 | 13.1 | 29.7 |
| 2 | HDT ASTM D 648 | ° C. | 1.8 MPa/3.2 mm | 88.6 | 112.5 | 110.7 | 86.9 |
| 3 | Notched Izod ASTM D256 | Impact Strength, J/m | 23° C./5 lbf/ft | 507 | 759 | 732 | 78.3 |
|  |  | Ductility (%) |  | 60 | 100 | 100 | 0 |
|  |  | Impact Strength, J/m | 0° C./5 lbf/ft | 89.2 | 277 | 180 | 70.3 |
|  |  | Ductility (%) |  | 0 | 0 | 0 | 0 |
| 4 | MAI ASTM D3763 | Ductility (%) | 23° C./3.3 m/s 3.2 mm | 100 | 100 | 100 | 100 |
|  |  | Energy, Total (J) |  | 66.5 | 64.8 | 53.1 | 67.3 |
|  |  | Ductility (%) | 0° C./3.3 m/s 3.2 mm | 100 | 100 | 100 | 100 |
|  |  | Energy, Total (J) |  | 69.4 | 66.5 | 69 | 72.8 |
| 5 | UL94 Vertical flame test | p(FTP), V-0 | 0.9 mm | 0.99 | 0.00 | 0.00 | 0.70 |
|  |  | p(FTP), V-1 | 23° C./48 h | 1.00 | 0.35 | 0.01 | 0.69 |
|  |  | FOT (Avg of t$_2$), s |  | 2.44 | 8.22 | 5.21 | 2.53 |
|  |  | FOT (Avg of all t$_1$ and t$_2$), s |  | 1.87 | 12.74 | 6.65 | 1.83 |
|  |  | Comments |  | V-0 | V-2 | V-2 | V-0 |
|  |  | p(FTP), V-0 | 0.9 mm | 0.70 | 0.17 | 0.35 | 1.00 |
|  |  | p(FTP), V-1 | 70° C./168 h | 0.70 | 0.28 | 0.70 | 1.00 |
|  |  | FOT (Avg of t$_2$), s |  | 1.66 | 2.95 | 5.00 | 1.86 |
|  |  | FOT (Avg of all t$_1$ and t$_2$), s |  | 1.25 | 3.88 | 4.58 | 1.37 |
|  |  | Comments |  | V-0 | V-2 | V-2 | V-0 |

Table 8 shows the properties obtained for the formulations shown in Table 7. Replacing BPADP with FRX-100, for Sample #5 and Sample #6, the HDT increases by over 20° C. (reaching up to 112° C.) and the notched Izod impact strength increased dramatically at 23° C. as the materials showed a ductile failure as opposed to brittle failure for Sample #4. The notched Izod impact strength for Samples #5 and #6 are also higher than that of Sample #4 at 0° C. Sample #4 and Sample #7 both contain BPADP and show poorer HDT and impact strength. For completeness, the multi-axial impact test was also done for Sample #s 4, 5, 6, and 7 and they all showed a ductile failure with good impact strength at 23° C. and at 0° C.

The flame properties are severely affected when BPADP is replaced with FRX-100. As shown in Table 8, for 0.9 mm thick flame bars tested under UL94 protocols, sample #s 5 and 6 show higher average flame out times (FOTs) and poorer flame retardancy ratings (V-2) than Sample #s 1 and 7 that show a V-0 rating. Consequently, the p(FTP) values are lower for Sample #s 5 and 6 than those for Sample #s 4 and 7. This indicates that only FRX-100 alone does not act as a good flame retardant, possibly due to its polymeric nature. Comparing Sample #4 with Sample #7, it also becomes clear that the addition of FRX-100 on top of BPADP does not affect the FOT much thereby again supporting the poor flame retarding nature of FRX-100. Therefore, it is found that not all phosphorous containing additives and not all solid flame retardants serve as effective flame retardants for the flame retardant compositions.

Example 3

This example was also conducted to show that the phosphazene SPB-100 performed better than a polymeric phosphate flame retardant FRX-100 flame retardant compositions that contain polycarbonate compositions and an ABS impact modifier.

The FRX-100 has the polymeric phosphate flame retardant has the structure shown in the formula (30a)

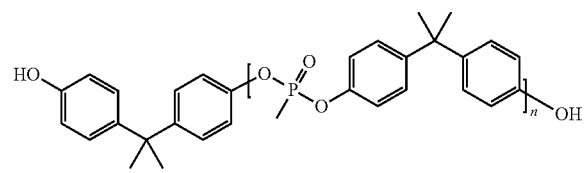
(30a)

In this sample, the polycarbonate composition contained high flow polycarbonate—a copolyestercarbonate that contains sebacic acid in addition to the polysiloxane-carbonate copolymer (detailed in Table 2). Table 9 shows another set of formulations in which SPB-100 and FRX-100 have been evaluated with a different set of building blocks and minor additives (see Table 5 for the entire list of ingredients). Sample 8 does not contain any SPB-100 or FRX-100 but contains the common RDP flame retardant and therefore serves as a control for this set of samples (Samples 8 to 14). Other samples in Table 5 do not contain RDP flame retardant but contain SPB-100 (Sample #s 9 to 11) or FRX-100 (Sample #s 12 to 14). The phosphorous content of Sample 8 (through 8 wt % RDP) is the same as that of Sample 9 (through 6.4 wt % SPB-100) and of Sample 12 (through 8 wt % FRX-100).

TABLE 9

| Item Description | Unit | Sample #8 | Sample #9 | Sample #10 | Sample #11 | Sample #12 | Sample #13 | Sample #14 |
|---|---|---|---|---|---|---|---|---|
| PC1 | wt % | 80.5 | 82.1 | 75.1 | 78.5 | 80.5 | 76.5 | 72.5 |
| Emulsion ABS | wt % | 8.0 | 8.0 | 8.0 | 8.0 | 8.0 | 8.0 | 8.0 |
| Bulk SAN | wt % | 2.25 | 2.25 | 2.25 | 2.25 | 2.25 | 2.25 | 2.25 |
| PC3 | wt % | | | 7.0 | | | | |
| RDP | wt % | 8.0 | | | | | | |
| SPB-100 | wt % | | 6.4 | 6.4 | 10 | | | |
| FRX-100 | wt % | | | | | 8.0 | 12 | 16 |
| Hindered phenol stabilizer | wt % | 0.2 | 0.2 | 0.2 | 0.2 | 0.2 | 0.2 | 0.2 |
| Veggie PETS | wt % | 0.50 | 0.50 | 0.50 | 0.50 | 0.50 | 0.50 | 0.50 |
| Phosphite stabilizer | wt % | 0.10 | 0.10 | 0.10 | 0.10 | 0.10 | 0.10 | 0.10 |
| SAN encapsulated PTFE - intermediate resin | wt % | 0.50 | 0.50 | 0.50 | 0.50 | 0.50 | 0.50 | 0.50 |

The properties are shown in the Tables 10 and 11 below. Table 10 shows the mechanical and thermal properties, while the flame retardant properties are shown in the Table 11 below.

TABLE 10

| Test No. | Test | Quantity/Unit | Condition | Sample #8 | Sample #9 | Sample #10 | Sample #11 | Sample #12 | Sample #13 | Sample #14 |
|---|---|---|---|---|---|---|---|---|---|---|
| 1 | MVR ASTM D 1238 | cm$^3$/10 min | 260° C./2.16 KG/ 360 s | 23.7 | 17.8 | 15.9 | 25.9 | 16.7 | 21.7 | 38.8 |
| | | | 260° C./2.16 KG/ 1080 s | 276 | 19.9 | 18.5 | 27.3 | 20.3 | 24.4 | 39.2 |
| 2 | HDT ASTM D 648 | ° C. | 1.8 MPa/ 6.4 mm | 97 | 111 | 110 | 103 | 118 | 117 | 115 |
| 3 | Notched Izod ASTM D256 | Impact Strength, J/m | 23° C./5 lbf/ft | 132 | 645 | 710 | 621 | 165 | 103 | 64 |
| | | Ductility (%) | | 0 | 100 | 100 | 100 | 0 | 0 | 0 |
| | | Impact Strength, J/m | 0° C./5 lbf/ft | 102 | 624 | 683 | 411 | 157 | 85 | 53 |
| | | Ductility (%) | | 0 | 100 | 100 | 50 | 0 | 0 | 0 |
| 4 | Multi-axial Impact ASTM D3763 | Total energy (J) | 23° C./3.6 m/s/ 3.2 mm | 62 | 63 | 65 | 61 | 59 | 5 | 3 |
| | | Ductility (%) | | 100 | 100 | 100 | 100 | 100 | 0 | 0 |
| | | Total energy (J) | 0° C./3.6 m/s/ 3.2 mm | 68 | 66 | 67 | 66 | 63 | 3 | 2 |
| | | Ductility (%) | | 100 | 100 | 100 | 100 | 60 | 0 | 0 |

TABLE 11

| Test No. | Test | Quantity/Unit | Condition | Sample #8 | Sample #9 | Sample #10 | Sample #11 | Sample #12 | Sample #13 | Sample #14 |
|---|---|---|---|---|---|---|---|---|---|---|
| 5 | UL94 Vertical flame test | p(FTP), V-0 | 1.2 mm | 0.00 | 0.04 | 0.20 | 0.99 | Not evaluated based on results for 1.5 mm thick flame bars | | |
| | | p(FTP), V-1 | 23° C./48 h | 0.00 | 0.84 | 0.95 | 1.00 | | | |
| | | UL94 rating at 1.2 mm | | V-2 | V-1 | V-1 | V-0 | | | |
| | | p(FTP), V-0 | 1.2 mm | 0.03 | 0.50 | 0.82 | 0.87 | | | |
| | | p(FTP), V-1 | 70° C./ 168 h | 0.33 | 0.99 | 1.00 | 1.00 | | | |
| | | UL94 rating at 1.2 mm | | V-2 | V-1 | V-0 | V-0 | | | |
| | | p(FTP), V-0 | 1.5 mm | 1 | 0.94 | 0.93 | 1 | 0 | 0 | 0 |
| | | p(FTP), V-1 | 23° C./48 h | 1 | 1 | 1 | 1 | 0 | 0.06 | 0.13 |
| | | UL94 rating at 1.5 mm | | V-0 | V-0 | V-0 | V-0 | V-2 | V-2 | No V-0, V-1 or V-2 rating |
| | | p(FTP), V-0 | 1.5 mm | 1 | 1 | 1 | 1 | 0 | 0.11 | 0.07 |
| | | p(FTP), V-1 | 70° C./ 168 h | 1 | 1 | 1 | 1 | 0.14 | 0.49 | 0.26 |
| | | UL94 rating at 1.5 mm | | V-0 | V-0 | V-0 | V-0 | V-2 | V-2 | No V-0, V-1 or V-2 rating |

Table 10 shows the properties of Sample #s 8 to 14. Significant increase in the HDT is observed for Sample #s 9 to 14 indicating a gain of up to 21° C. over Sample #8. SPB-100 is also able to significantly enhance the notched Izod impact strength at 23° C. and at 0° C. both with and without the presence of EXL PC (i.e., the 20 wt % polysiloxane-carbonate copolymer). However, FRX-100 is not able to improve the impact strength from that of Sample #8 without the presence of EXL PC. In comparison, as seen earlier, the presence of EXL PC allowed FRX-100 based materials to maintain high impact strength (see Sample #5 and #6 in Table 7 and 8). This indicates a synergistic behavior between FRX-100 and EXL PC. Likewise, multi-axial impact test for Sample #s 8 to 11 showed ductile behavior with high impact strength, but for Sample #s 12 to 14 (containing FRX-100), brittle failure with poor impact is observed.

The flame performance results for Sample #s 8 to 14 are also provided in Table 11. SPB-100 improves the flame performance over RDP, but FRX-100 does not serve as a good flame retardant. It is seen that the flame rating improves significantly as RDP is replaced with SPB-100. At 1.2 mm thickness, while Sample #8 has a V-2 rating, Sample #s 9, 10 have a V-1 rating and Sample #11 has a V-0 rating. When samples contain SPB-100, this improvement occurs simultaneously with improvements in the mechanical properties as described above. This is surprising because improved flame performance generally come at the cost of mechanical properties (i.e., the addition of a flame retardant generally leads to lower mechanical properties). Sample #s 12 to 14 showed worse flame performance as compared to Sample #8 showing that FRX-100 is not as good as RDP even at double the phosphorous content (Sample #12 contains 16 wt % FRX-100 which amounts to double the phosphorous content of Sample #8 which contains RDP).

Example 4

This example was conducted to demonstrate leach-out performance of a flame retardant composition that contains a phosphazene flame retardant. For biocompatible thermoplastics there is a limit on the quantity and type of chemicals that can be allowed to leach out of the material over its period of use. ISO 10993 testing is done to classify materials as biocompatible. Isopropyl alcohol (IPA) and Isooctane comparative extractive results The flame retardant composition pellets containing the flame retardants BPADP and SPB-100 (Samples #16 and 17 in the Table 12a) were extracted with isopropanol and isooctane separately, at reflux conditions for 24 hours (@ 10 g/100 ml). The collected extracts were then injected into HPLC attached with UV detector under the following chromatographic conditions. The isopropanol extracts were injected as is. Isooctane extract on the other hand, was evaporated and re-dissolved in isopropanol and then injected into the HPLC column. The HPLC column was a Zorbax Eclipsed XDB C18 (4.6×150 mm; 5 µm). The HPLC columns were operated with two mobile phases' water (A) and acetonitrile (B) as can be seen in the Table 12b.

Table 12a below shows the two samples of flame retardant composition made for extractable studies. Sample #16 contains 10 wt % of BPADP, while Sample #17 contains 10 wt % SPB-100. As detailed above, extraction studies were performed in three different solvents namely water (pellets immersed for 24 hours at 100° C.), isopropanol (pellets immersed for 24 hours at reflux condition) and isooctane (pellets immersed for 24 hours at reflux condition). The extracts collected at the end of 24 hours were analyzed. Only trace levels (less than 0.1 parts per million (ppm)) of calcium and sodium were detected in the water extract. Results of isopropanol and isooctane extract analysis are shown in Table 12c. The sample containing SPB-100 showed some prominent peaks but the number of peaks is significantly less than that shown by the formulation containing BPADP. This indicates the potential for SPB-100 to be a better candidate than BPADP (or RDP) and to achieve biocompatibility by reducing the amount of materials leached out while maintaining and improving several other properties.

Table 12

TABLE 12a

| Item Description | Unit | Sample #16 | Sample #17 |
|---|---|---|---|
| PC1 | wt % | 65.82 | 65.82 |
| PC2 | wt % | 5.72 | 5.72 |
| PC3 | wt % | 14 | 14 |
| BPADP | wt % | 10 | |
| SPB-100 Flame Retardant | wt % | | 10 |
| FRX-100 Flame Retardant | Wt % | | |
| Bulk ABS | wt % | 3 | 3 |
| Phosphite stabilizer | wt % | 0.08 | 0.08 |
| PETS | wt % | 0.3 | 0.3 |
| Hindered phenol antioxidant | wt % | 0.08 | 0.08 |
| TSAN | wt % | 1 | 1 |

TABLE 12b

| Time (min) | A | B |
|---|---|---|
| 0.0 | 70 | 30 |
| 5.0 | 70 | 30 |
| 20.0 | 10 | 90 |
| 30.0 | 10 | 90 |
| 35.0 | 2 | 98 |
| 45.0 | 2 | 98 |
| 50.0 | 70 | 30 |
| 60.0 | 70 | 30 |

TABLE 13

| Item Description | Unit | Sample #19 | Sample #20 |
|---|---|---|---|
| PC2 | wt % | 41.21 | 41.21 |
| PC1 | wt % | 27.23 | 27.23 |
| Bulk ABS RESIN | wt % | 18 | 18 |
| Bisphenol A bis(diphenyl phosphate) | wt % | 12.25 | |
| SPB-100 Flame Retardant | wt % | | 12.25 |
| PHOSPHITE STABILIZER | wt % | 0.08 | 0.08 |
| PENTAERYTHRITOL TETRASTEARATE | wt % | 0.5 | 0.5 |
| HINDERED PHENOL ANTI-OXIDANT | wt % | 0.08 | 0.08 |
| SAN encapsulated PTFE - intermediate resin | wt % | 0.65 | 0.65 |

TABLE 14

| No. | Test | Description | Quantity, Unit | Condition | Sample #19 | Sample #20 |
|---|---|---|---|---|---|---|
| 1 | MVR | ASTM D 1238 | $cm^3$/10 min | 260° C./2.16 KG/ 360 s | 17.8 | 14.7 |
| 2 | HDT | ASTM D 648 | ° C. | 1.8 MPa, 3.2 mm | 81.3 | 87.1 |
| 3 | Notched Izod | ASTM D256 | J/m Ductility | 23° C./5 lbf/ft | 119 0 | 842 100 |
| 4 | Notched Izod | ASTM D256 | J/m Ductility | 0° C./5 lbf/ft | 93 0 | 417 60 |
| 5 | Uniaxial Tensile | ASTM D638 | Modulus, MPa Tensile strength at yield, MPa | 23° C./50 mm/min | 2790 62.7 | 2330 53.6 |
| 6 | VXTOOL p(FTP) | 1.5 mm | p(FTP) V-0 | 23° C./48 h | 0.35 | 0.30 |
| | | | | 70° C./168 h | 1.00 | 0.85 |
| | | 1.2 mm | p(FTP) V-0 | 23° C./48 h | 0.00 | 0.16 |
| | | | | 70° C./168 h | 0.42 | 0.36 |

TABLE 12c

| Flame retardant | Number of peaks (number of chemicals) | |
|---|---|---|
| | IPA extractive results | Isooctane extractive results |
| BPADP | 36 | 22 |
| SPB-100 | 35 | 18 |

Comparative Example 5

This example was conducted to demonstrate that the flame retardant composition containing a phosphazene (SPB-100) does not show superior flame retardant properties as compared with the comparative flame retardant compositions that contains BPADP, when both compositions do not contain EXL PC (i.e., the 20 wt % polysiloxane-carbonate copolymer). Both samples in this example serve as comparative samples. This set of data serves as a control for the other EXL PC containing formulations in this disclosure.

These samples were prepared in a manner similar to those in Example 1 with the only difference being that in this example the polycarbonate composition does not contain EXL PC (20 wt % polysiloxane-carbonate copolymer).

Table 13 displays the composition, while Table 14 shows the properties.

Table 13 and Table 14 show no improvement in flame retardancy upon replacing BPADP with SPB-100 in the flame retardant composition that does not contain the polysiloxane-carbonate copolymer even when 12.25 wt % of SPB-100 was used. Impact properties at room temperature and the heat distortion temperature improved but the flame retardancy did not. Without being limited to theory, improved mechanical properties without an improvement in flame retardancy is a significant disadvantage for flame retardant composition. The present disclosure shows the surprising synergistic benefits in flame retardancy along with improved mechanical properties when phosphazene is used together with the polysiloxane-carbonate copolymer. In addition, in combination with the polysiloxane-carbonate copolymer, sometimes a significantly less amount of phosphazene may be used to get superior flame retardancy, and because less of the flame retardant is used, the mechanical properties are improved even more as shown in Example 7.

Example 6

This example uses a polycarbonate composition that contains the EXL PC (i.e., the 20 wt % polysiloxane-carbonate copolymer). This example was conducted to demonstrate the synergy between the SPB-100 and the polysiloxane-carbonate copolymer in a polycarbonate composition. Table 15 and Table 16 show improved impact (even low temperature), HDT, and flame performance as BPADP is replaced with SPB-100 in an polysiloxane-carbonate copolymer containing formulation. The compositions of this example were manufactured in a manner similar to those samples in Example 1. In the Table 15, it can be seen that in successive samples there is a progressive reduction in the amount of BPADP with a progressive increase in the amount of SPB-100.

TABLE 15

| Item Description | Unit | Sample #21 | Sample #22 | Sample #23 | Sample #24 | Sample #25 |
|---|---|---|---|---|---|---|
| PC1 | wt % | 65.8 | 66.6 | 67.4 | 68.1 | 68.9 |
| PC2 | wt % | 5.7 | 5.8 | 5.9 | 5.9 | 6.0 |
| PC3 | wt % | 14 | 14 | 14 | 14 | 14 |
| Bisphenol A bis(diphenyl phosphate) | wt % | 10 | 7.5 | 5 | 2.5 | |
| SPB-100 Flame Retardant | wt % | | 1.7 | 3.3 | 5.0 | 6.6 |
| Bulk ABS RESIN | wt % | 3 | 3 | 3 | 3 | 3 |
| PHOSPHITE STABILIZER | wt % | 0.08 | 0.08 | 0.08 | 0.08 | 0.08 |
| PENTAERYTHRITOL TETRASTEARATE | wt % | 0.3 | 0.3 | 0.3 | 0.3 | 0.3 |
| HINDERED PHENOL ANTI-OXIDANT | wt % | 0.08 | 0.08 | 0.08 | 0.08 | 0.08 |
| SAN encapsulated PTFE - intermediate resin | wt % | 1 | 1 | 1 | 1 | 1 |
| Formulation Total | | 100 | 100 | 100 | 100 | 100 |
| Percent phosphorus from SPB-100 | | 0 | 25 | 50 | 75 | 100 |

TABLE 16

| Test No. | Test | Quantity/Unit | Condition | Sample #21 | Sample #22 | Sample #23 | Sample #24 | Sample #25 |
|---|---|---|---|---|---|---|---|---|
| 1 | MVR ASTM D 1238 | cm³/10 min | 260° C./2.16 KG/360 s | 17.3 | 15.3 | 14.5 | 13.9 | 12.8 |
| 2 | XRF | Phosphorous (%) | | 0.81 | 0.81 | 0.80 | 0.81 | 0.83 |
| 3 | HDT ASTM D 648 | ° C. | 1.8 MPa/6.4 mm | 96 | 99 | 101 | 105 | 108 |
| 4 | Notched Izod ASTM D256 | Impact Strength, J/m | 23° C./5 lbf/ft | 507 | 804 | 825 | 899 | 900 |
| | | Ductility (%) | | 60 | 100 | 100 | 100 | 100 |
| | | Impact Strength, J/m | 0° C./5 lbf/ft | 89.2 | 122 | 155 | 757 | 813 |
| | | Ductility (%) | | 0 | 0 | 0 | 100 | 100 |
| | | Impact Strength, J/m | −20° C./5 lbf/ft | — | — | — | 134 | 166 |
| | | Ductility (%) | | — | — | — | 0 | 0 |
| 7 | UL94 Vertical flame test | p(FTP), V-0 | 0.6 mm 23° C./48 h | 0.2 | 0.7 | 1.0 | 1.0 | 1.0 |
| | | p(FTP), V-0 | 0.6 mm 70° C./168 h | 1.0 | 0.8 | 1.0 | 1.0 | 1.0 |

From the Table 16, it may be seen that the samples containing the EXL PC show excellent flame retardancy of V-0 at 0.6 mm. Additionally, a lot less SPB-100 is used in the presence of EXL PC, which indicates synergy between SPB-100 and EXL PC. The samples containing only the phosphazene compound (SPB-100) show a notched Izod impact strength greater than or equal to about 550 Joules per meter, a heat distortion temperature greater than 100° C., while at the same time displaying a first time pass probability of 100%.

Example 7

This example was conducted to show that very small amounts of the phosphazene flame retardant can provide a high value of p(FTP) for achieving V-0 in polycarbonate compositions containing the EXL PC. This facilitates retention of the ductility in the polycarbonate composition, while at the same time providing it with superior flame retardancy, a feature that cannot be easily accomplished with other flame retardants such as RDP, BPADP, and flame retardant salts such as KSS, Rimar salt, and the like. The composition is shown in the Table 17, while the properties are shown in the Table 18. The compositions of Table 17 were manufactured in a manner similar to that of the Example 1.

TABLE 17

| Item Description | Unit | Sample #26 | Sample #27 | Sample #28 | Sample #29 |
|---|---|---|---|---|---|
| PC1 | wt % | 65.82 | 68.86 | 70.42 | 72.26 |
| PC2 | wt % | 5.72 | 5.98 | 6.12 | 6.28 |
| PC3 | wt % | 14 | 14 | 14 | 14 |
| Bisphenol A bis(diphenyl phosphate) | wt % | 10 | | | |
| SPB-100 Flame Retardant | wt % | | 6.7 | 5 | 3 |
| Bulk ABS RESIN | wt % | 3 | 3 | 3 | 3 |
| PHOSPHITE STABILIZER | wt % | 0.08 | 0.08 | 0.08 | 0.08 |
| PENTAERYTHRITOL TETRASTEARATE | wt % | 0.3 | 0.3 | 0.3 | 0.3 |
| HINDERED PHENOL ANTI-OXIDANT | wt % | 0.08 | 0.08 | 0.08 | 0.08 |
| SAN encapsulated PTFE - intermediate resin | wt % | 1 | 1 | 1 | 1 |

TABLE 18

| Test No. | Test | Quantity/Unit | Condition | Sample #26 | Sample #27 | Sample #28 | Sample #29 |
|---|---|---|---|---|---|---|---|
| 1 | MVR ASTM D 1238 | $cm^3$/10 min | 260° C./2.16 KG/ 360 s | 17.3 | 13.0 | 11.1 | 9.0 |
| 2 | MV M ISO11443 | Melt Viscosity (Pa.s) | 260° C./10000 $s^{-1}$ | 70 | 83 | 88 | 96 |
| 3 | HDT ASTM 648 | ° C. | 1.8 MPa/6.4 mm | 101 | 109 | 112 | 117 |
| 4 | Notched Izod ASTM D256 | Impact Strength, J/m | 23° C./5 lbf/ft | 751 | 912 | 887 | 833 |
|  |  | Ductility (%) |  | 100 | 100 | 100 | 100 |
|  |  | Impact Strength, J/m | 0° C./5 lbf/ft | 124 | 811 | 825 | 771 |
|  |  | Ductility (%) |  | 0 | 100 | 100 | 100 |
|  |  | Impact Strength, J/m | −20° C./5 lbf/ft | 113 | 195 | 506 | 645 |
|  |  | Ductility (%) |  | 0 | 0 | 60 | 100 |
| 5 | UL94 Vertical flame test | p(FTP), V-0 | 0.6 mm 23° C./48 h | 1.0 | 1.0 | 0.73 | 0.67 |
|  |  | p(FTP), V-0 | 0.6 mm 70° C./168 h | 0.98 | 1.0 | 1.0 | 1.0 |
| 6 | 5VB |  | 1.2 mm | — | Pass | Pass | Pass |

From the Table 18 it may be seen that samples as thin as 0.6 millimeter display a flame retardancy of V-0 when tested as per the UL-94 protocol. These samples contain as little as 3 wt % of the phosphazene compound (SPB-100). The samples show heat distortion temperatures of greater than 110° C., specifically greater than 115° C., and more specifically greater than or equal to 117° C., when tested as per ASTM D 1238. The samples also display a good melt volume flow rate of 8 to 15 kilograms per 360 seconds.

The sample #s 27-30 depict a synergy between the polysiloxane-carbonate copolymer and the phosphazene, which enhances the flame retardancy for samples that are less than 1 millimeter in thickness, specifically less than or equal to 0.8 millimeter in thickness, and more specifically less than or equal to 0.6 millimeter in thickness when tested as per a UL-94 protocol. All of these samples display a V-0 flame retardancy. In addition, the samples that contain the phosphazene flame retardant show a 5VB flame retardancy at a thickness of 1.2 millimeters when tested as per the UL-94 protocol.

In summary, Tables 18 and 19 show that in combination with 20 wt % polysiloxane-carbonate copolymer, a lot less SPB-100 can result in V-0 rating even at 0.6 mm. The benefit of being able to use less SPB-100 in this special resin system is an improvement in HDT and impact at −20° C.

Example 8

This example was conducted to further demonstrate the synergy between 20 wt % polysiloxane-carbonate copolymer and the phosphazene compound (SPB-100). The compositions are show in the Table 19 and the properties are shown in the Table 20. The compositions of Table 19 are manufactured similarly to the compositions of Example 1.

TABLE 19

| Item Description | Unit | Sample #30 | Sample #31 | Sample #32 | Sample #33 | Sample #34 | Sample #35 |
|---|---|---|---|---|---|---|---|
| PC1 | wt % | 65.82 | 68.86 | 70.42 | 72.26 | 78.7 | 81.74 |
| PC2 | wt % | 5.72 | 5.98 | 6.12 | 6.28 | 6.84 | 7.1 |
| PC3 | wt % | 14 | 14 | 14 | 14 |  |  |
| Bisphenol A bis(diphenyl phosphate) | wt % | 10 |  |  |  | 10 |  |
| SPB-100 Flame Retardant | wt % |  | 6.7 | 5 | 3 |  | 6.7 |
| Bulk ABS RESIN | wt % | 3 | 3 | 3 | 3 | 3 | 3 |
| PHOSPHITE STABILIZER | wt % | 0.08 | 0.08 | 0.08 | 0.08 | 0.08 | 0.08 |
| PENTAERYTHRITOL TETRASTEARATE | wt % | 0.3 | 0.3 | 0.3 | 0.3 | 0.3 | 0.3 |
| HINDERED PHENOL ANTI-OXIDANT | wt % | 0.08 | 0.08 | 0.08 | 0.08 | 0.08 | 0.08 |
| SAN encapsulated PTFE - intermediate resin | wt % | 1 | 1 | 1 | 1 | 1 | 1 |

TABLE 20

| Test No. | Test | Quantity/Unit | Condition | Sample #30 | Sample #31 | Sample #32 | Sample #33 | Sample #34 | Sample #35 |
|---|---|---|---|---|---|---|---|---|---|
| 7 | UL94 Vertical | p(FTP), V-0 | 0.6 mm | 1.0 | 1.0 | 0.73 | 0.67 | 0.11 | 0.0 |
|  |  | FOT (Avg of all | 23° C./48 h | 1.4 | 1.6 | 2.9 | 3.5 | 3.1 | 8.4 |

TABLE 20-continued

| Test No. | Test | Quantity/Unit | Condition | Sample #30 | Sample #31 | Sample #32 | Sample #33 | Sample #34 | Sample #35 |
|---|---|---|---|---|---|---|---|---|---|
| | flame test | $t_1$ and $t_2$), s p(FTP), V-0 FOT (Avg of all $t_1$ and $t_2$), s | 0.6 mm 70° C./168 h | 0.98 1.3 | 1.0 1.5 | 1.0 1.5 | 1.0 2.3 | 0.75 1.3 | 0.55 1.8 |

Table 19 and 20 show that SPB-100 and 20 wt % polysiloxane-carbonate copolymer when used together result in superior flame retardant properties. For example, Sample #35 that contains only the SPB-100 shows a p(FTP) of 055 when tested for V-0 as per the UL-94 protocol. A sample having only the EXL PC has been shown to have a p(FTP) of close to 0. If the two materials were to be theoretically combined, then one would predict that the p(FTP) would be equal to the sum of both probabilities, which would be equal to 0.55 or 0.6 respectively. However, when these two materials are combined as seen in Sample #s 31-33, the p(FTP) increases to 1. This reflects a synergy between the EXL PC and the phosphazene flame retardant, which is not predictable.

When the 20 wt % polysiloxane-carbonate copolymer is removed from the SPB-100 and BPADP containing flame retardant compositions, the compositions undergoes a significantly larger increase in the flame out time (8.4 s) for the latter. This means that BPADP by itself is better than SPB-100 by itself, but the combination of SPB-100 and 20 wt % polysiloxane-carbonate copolymer is better than combination of BPADP with 20 wt % polysiloxane-carbonate copolymer inn the flame retardant composition. This is surprising. Even at lower SPB-100 loadings, having 20 wt % polysiloxane-carbonate copolymer in the formulation results in better p(FTP) values than the formulation that did not contain 20 wt % polysiloxane-carbonate copolymer but that contained a higher level of SPB-100. This proves that SPB-100 by itself is not good but it forms an outstanding synergistic combination with 20 wt % polysiloxane-carbonate copolymer, when both are used in a flame retardant composition.

Example 9

This example demonstrates a synergy between EXL PC and phosphazene when the polycarbonate composition contains a high heat polycarbonate copolymer in addition to the polycarbonates used in the Example 1. The high heat polycarbonate is a copolymer of PPPBP (also known as 3,3-bis (4-hydroxyphenyl)-2-phenylisoindolin-1-one—see the structure of formula (9) above) and Bisphenol A. The high heat polycarbonate contains 35 mole percent PPPBP and has a weight average molecular weight of 25,000 grams per mole. The compositions shown herein also contain MBS (methyl methacrylate-butadiene-styrene impact modifier).

The composition is shown in the Table 21 and is compounded in a manner similar to Example 1.

TABLE 21

| Item Description | Unit | Sample #36* | Sample #37* | Sample #38 | Sample #39 |
|---|---|---|---|---|---|
| PC2 | wt % | 11.04 | 17.64 | 11.04 | 17.64 |
| PC1 | wt % | 53 | 53 | 53 | 53 |
| PC4 | wt % | 6.6 | | 6.6 | |
| MB, powder | wt % | 2 | 2 | 2 | 2 |
| 20% PC/SILOXANE COPOLYMER, PCP-ENDCAPPED | wt % | 16 | 16 | 16 | 16 |
| Bisphenol A bis(diphenyl phosphate) | wt % | 10.5 | 10.5 | | |
| SPB-100 Flame Retardant | wt % | | | 10.5 | 10.5 |
| PHOSPHITE STABILIZER | wt % | 0.08 | 0.08 | 0.08 | 0.08 |
| PENTAERYTHRITOL TETRASTEARATE | wt % | 0.3 | 0.3 | 0.3 | 0.3 |
| HINDERED PHENOL ANTI-OXIDANT | wt % | 0.08 | 0.08 | 0.08 | 0.08 |
| SAN encapsulated PTFE - intermediate resin | wt % | 0.4 | 0.4 | 0.4 | 0.4 |

*comparative compositions

In the Table 21 above, sample #s 36 and 37 contain BPADP, while sample #s 38 and 39 are examples that display the disclosed compositions. Sample #36 and 37 are comparative compositions. Sample #s 36 and 38 contain the high heat polycarbonate, while sample #s 37 and 39 do not contain the high heat polycarbonate. Table 22 shows the properties.

TABLE 22

| Test No. | Test | Quantity/Unit | Condition | Sample #36* | Sample #37* | Sample #38 | Sample #39 |
|---|---|---|---|---|---|---|---|
| 1 | MVR ASTM D 1238 | cm³/10 min | 260° C./2.16 KG/360 s | 20 | 20 | 17 | 16 |
| | | | 260° C./2.16 KG/1080 s | 22 | 22 | 18 | 17 |
| 2 | MVR ISO11443 | Melt Viscosity (Pa.s) | 260° C./644.5 s$^{-1}$ | 290 | 296 | 332 | 353 |
| | | | 260° C./10000 s$^{-1}$ | 64 | 65 | 66 | 70 |
| 3 | HDT ASTM D 648 | ° C. | 0.455 MPa/3.2 mm | 101 | 99 | 112 | 111 |
| | | | 1.8 MPa/6.4 mm | 96 | 95 | 104 | 104 |
| 4 | Vicat ISO306 | ° C. | 50 N/120° C./h | 110 | 109 | 117 | 117 |
| 5 | Notched Izod ASTM D256 | Impact Strength, J/m | 23° C./5 lbf/ft | 650 | 738 | 805 | 880 |
| | | Ductility (%) | | 100 | 100 | 100 | 100 |
| | | Impact Strength, J/m | 0° C./5 lbf/ft | 529 | 582 | 726 | 789 |
| | | Ductility (%) | | 100 | 100 | 100 | 100 |
| | | Impact Strength, J/m | −20° C./5 lbf/ft | 124 | 324 | 666 | 721 |
| | | Ductility (%) | | 0 | 20 | 100 | 100 |
| | | Impact Strength, J/m | −30° C./5 lbf/ft | — | — | 611 | 666 |

TABLE 22-continued

| Test No. | Test | Quantity/Unit | Condition | Sample #36* | Sample #37* | Sample #38 | Sample #39 |
|---|---|---|---|---|---|---|---|
| | | Ductility (%) | | — | — | 100 | 100 |
| | | Impact Strength, J/m | −40° C./5 lbf/ft | — | — | 173 | 471 |
| | | Ductility (%) | | — | — | 0 | 80 |
| 7 | UL94 Vertical flame test | p(FTP), V-0 | 0.6 mm 23° C./48 h | 1.0 | 1.0 | 1.0 | 0.8 |
| | | p(FTP), V-0 | 0.6 mm 70° C./168 h | 1.0 | 1.0 | 1.0 | 1.0 |

From the Table 22, it may be seen that the sample containing the EXL PC, the phosphazene compound and the high heat polycarbonate (Sample #38) shows a p(FTP) of 1.0 at a thickness of 0.6 millimeter or greater and an impact strength of over 450 Joules per meter at temperatures less than or equal to −30° C., specifically less than or equal to −35° C. and specifically less than or equal to −40° C. This behavior has not been observed in a polycarbonate/ABS or polycarbonate/MBS blend previously. Additionally, it may be noted that while the high heat copolymer PPPBP/BPA copolycarbonate is known to improve the HDT, if all other components remain the same, this copolymer is also expected to cause a drop in impact strength. However, in this example excellent impact performance is observed with high heat copolymers in combination with SPB-100, and ductility at even −30° C. is achieved. These results are surprising.

Example 10

In this example the high heat polycarbonate from Example 9 was replaced with a BisAP/BPA copolymer. The BisAP (also called bisphenol AP) polycarbonate is derived from the dihydroxy compound of formula (10) above. This polycarbonate is copolymerized with a polycarbonate derived from the reaction of bisphenol A with phosgene. The BisAP/BPA copolymer is endcapped with para-cumyl phenol (PCP). The samples of this example were produced in the same manner as the samples of Example 9. The composition is shown in Table 23, while the properties are shown in the Table 24. Once again it may be noted that while incorporation of Bisphenol AP/BPA copolycarbonate improves the HDT, the impact strength for the BPADP containing samples are low whereas excellent impact resistance can be achieved when SPB-100 is employed as the flame retardant thereby improving HDT and impact performance simultaneously. Thus a high heat copolymer (that is usually detrimental to impact strength, but which improves HDT) can be employed with SPB-100 to offset the balance between the two properties and drive these two key properties towards simultaneous improvement.

TABLE 23

| Item Description | Unit | Sample #40 | Sample #41 | Sample #42 | Sample #43 |
|---|---|---|---|---|---|
| PC2 | wt % | 9.8 | 9.8 | 4.9 | 4.9 |
| PC1 | wt % | 39.4 | 39.4 | 24.6 | 24.6 |
| PC5 | wt % | 19.7 | 19.7 | 39.4 | 39.4 |
| Bulk ABS resin | wt % | 9.8 | 9.8 | 9.8 | 9.8 |
| BPADP | wt % | 9.8 | | 9.8 | |
| SPB-100 Flame Retardant | wt % | | 9.8 | | 9.8 |
| 20% PC/SILOXANE COPOLYMER, PCP-ENDCAPPED | wt % | 9.8 | 9.8 | 9.8 | 9.8 |
| SAN encapsulated PTFE - intermediate resin | wt % | 0.8 | 0.8 | 0.8 | 0.8 |
| PHOSPHITE STABILIZER | wt % | 0.1 | 0.1 | 0.1 | 0.1 |
| PENTAERYTHRITOL TETRASTEARATE | wt % | 0.2 | 0.2 | 0.2 | 0.2 |
| HINDERED PHENOL ANTI-OXIDANT | wt % | 0.3 | 0.3 | 0.3 | 0.3 |
| SEENOX 412S pentaerythritol betalaurylthiopropionate | wt % | 0.2 | 0.2 | 0.2 | 0.2 |

TABLE 24

| Test No. | Test | Quantity/Unit | Condition | Sample #40 | Sample #41 | Sample #42 | Sample #43 |
|---|---|---|---|---|---|---|---|
| 1 | MVR ASTM D 1238 | cm³/10 min | 260° C./2.16 KG/360 s | 15.6 | 13.5 | 13.9 | 10.4 |
| 2 | HDT ASTM D 648 | ° C. | 1.82 MPa/6.4 mm | 99 | 105 | 103 | 110 |
| 3 | Notched Izod ISO 180 | Impact Strength, kJ/m² | 23° C./5.5 J | 16.8 | 55.4 | 13.7 | 47.8 |
| | | Ductility (%) | | 10 | 100 | 0 | 100 |
| 4 | UL94 Vertical flame test | p(FTP), V-0 FOT, t1 + t2 average, s | 1.2 mm 23° C./48 h | 1.0 2.3 | 1.0 1.7 | 1.0 1.5 | 1.0 1.0 |
| | | p(FTP), V-0 FOT, t1 + t2 average, s | 1.2 mm 70° C./168 h | 1.0 1.7 | 1.0 1.2 | 1.0 1.1 | 1.0 0.8 |
| 5 | UL94 5VB | | 2 mm 23° C./48 h 70° C./168 h | Fail | Pass | Pass | Pass |
| 6 | UL94 5VA | | 3 mm 23° C./48 h 70° C./168 h | Pass | Pass | Pass | Pass |

From the Table 24 it may be seen that the combined use of the copolycarbonate comprising bisphenol AP and bisphenol A along with the EXL PC and SPB-100 produces superior flame retardancy in addition to superior HDT results and melt volume flow rate. The results in the Table 24 parallel those seen in Table 22.

Example 11

This example was conducted to determine hydro stability in the flame retardant composition. Pellets were kept in a hydro-aging oven maintained at 75° C. and 90% relative humidity for 1 week and the hydro-aged pellets were compared with un-aged pellets via a MVR test. Prior to this and every other MVR test, the pellets were dried for 4 hours at 100° C. to remove moisture. The composition is detailed in Table 25 and the results are shown in Table 26.

TABLE 25

| Item Description | Unit | Sample #44 | Sample #45 | Sample #46 | Sample #47 |
|---|---|---|---|---|---|
| PC1 | % | 65.82 | 65.82 | 65.82 | 68.84 |
| PC2 | % | 5.72 | 5.72 | 5.72 | 5.98 |
| PC3 | % | 14 | 14 | 14 | 14 |
| BPADP | % | 10 | 5 | | |
| SPB-100 Flame Retardant | % | | 5 | 10 | 6.71 |
| Bulk ABS | % | 3 | 3 | 3 | 3 |
| Phosphite stabilizer | % | 0.08 | 0.08 | 0.08 | 0.08 |
| PETS | % | 0.3 | 0.3 | 0.3 | 0.3 |
| Hindered Phenol Antioxidant | % | 0.08 | 0.08 | 0.08 | 0.08 |
| TSAN | % | 1 | 1 | 1 | 1 |

TABLE 26

| Test No. | Test | Quantity/Unit | Condition | Sample #44 | Sample #45 | Sample #46 | Sample #47 |
|---|---|---|---|---|---|---|---|
| 1 | MVR of unaged samples ASTM D 1238 | cm³/10 min | 260° C./2.16 Kg/ 360 s | 22.3 | 22.4 | 22.7 | 13.8 |
| 2 | MVR of hydroaged samples ASTM D 1238 | cm³/10 min | 260° C./2.16 Kg/ 360 s | 62.0 | 43.4 | 23.6 | 15.3 |
| | Change in MVR upon hydro-ageing | Hydroaged/unaged MVR | | 2.8 | 1.9 | 1.0 | 1.1 |

From the examples above, it may be seen that a flame retardant composition that contains a polycarbonate composition that comprises a polysiloxane-carbonate copolymer, an impact modifier and a phosphazene flame retardant produces superior flame retardancy in addition to displaying a suitable melt viscosity and improved heat distortion temperature when compared with flame retardant compositions that contain the same ingredients, but where the flame retardant is either BPADP, RDP or FRX-110. The advantage of using the phenoxyphosphazene is that in combination with the remainder of the flame retardant composition is that the resulting product displays a superior impact strength when compared with a comparative flame retardant composition that contains BPADP, RDP, or FRX-110. The results in Table 25 indicate the samples that contained only BPADP showed lower hydrostability than samples that contain BPADP and/or SPB-100, thereby reflecting that SPB-100 provides better hydrostability than other comparative flame retardants.

The probability of a first time pass of attaining V-0 as per UL-94 protocols is greater than or equal to 90% for samples comprising the disclosed flame retardant composition having a thickness of 0.75 millimeter or greater. In an embodiment, the probability of a first time pass of attaining V-0 as per UL-94 protocols is greater than or equal to 92%, specifically greater than or equal to 94%, specifically greater than or equal to 96%, and more specifically greater than or equal to 99%, for samples comprising the disclosed flame retardant composition having a thickness of 1.0 millimeter or less.

The samples of the disclosed flame retardant composition also show an impact strength of greater than or equal to 700 joules per meter, specifically greater than or equal to 800 joules per meter, and more specifically greater than or equal to 900 joules per meter, when tested as per ASTM D 256 at 23° C.

The samples also show a low average flame out time (FOT) of less than 5 seconds, and more specifically less than 3 seconds at thickness of 0.75 millimeters to 1.5 millimeters when tested as per UL-94 protocol.

The composition disclosed herein may be advantageously used to manufacture a variety of different articles such as computer housings, housings for electronic goods such as televisions, cell phones, tablet computers, automotive parts such as interior body panels, parts for aircraft, and the like.

It is to be noted that all ranges detailed herein include the endpoints. Numerical values from different ranges are combinable.

The transition term comprising encompasses the transition terms "consisting of" and "consisting essentially of".

The term "and/or" includes both "and" as well as "or". For example, "A and/or B" is interpreted to be A, B, or A and B.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:
1. A flame retardant composition comprising:
20 to 80 weight percent of a polycarbonate composition; where the polycarbonate composition comprises a polysiloxane-carbonate copolymer;
an impact modifier in an amount of 0.5 to 25 weight percent; and

1 to 20 weight percent of a phosphazene compound; where all weight percents are based on the total weight of the flame retardant composition.

2. The flame retardant composition of claim 1, comprising 1 to 15 weight percent of the phosphazene compound.

3. The flame retardant composition of claim 1, where the polycarbonate composition comprises a polycarbonate having a weight average molecular weight of 15,000 to 40,000 Daltons.

4. The flame retardant composition of claim 1, where the polycarbonate composition further comprises a copolyestercarbonate; where the copolyestercarbonate comprises a polyester derived from a reaction between sebacic acid and bisphenol A and a polycarbonate derived from a reaction between bisphenol A and phosgene.

5. The flame retardant composition of claim 1, where the polysiloxane-carbonate copolymer comprises 10 to 20 weight percent of a polysiloxane; and where the polysiloxane-carbonate copolymer is present in an amount of 3 to 25 weight percent, based on the total weight of the flame retardant composition.

6. The flame retardant composition of claim 1, where the polycarbonate composition comprises a linear polycarbonate, a branched polycarbonate, or a combination of a linear and a branched polycarbonate.

7. The flame retardant composition of claim 1, where the polycarbonate composition comprises a copolycarbonate; where the copolycarbonate is a copolymer of bisphenol A and a second monomer having a structure represented by the formula (9):

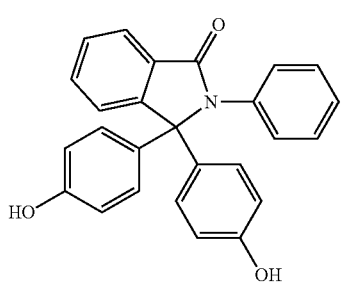

(9)

or a structure represented by the formula (10):

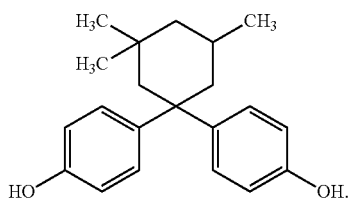

(10)

8. The flame retardant polycarbonate composition of claim 7, where the second monomer is present in an amount of 25 to 40 mole percent, and where the copolycarbonate has a weight average molecular weight of 15,000 to 35,000 Daltons.

9. The flame retardant polycarbonate composition of claim 1, where the impact modifier comprises an elastomer-modified graft copolymer comprising (i) an elastomeric polymer substrate having a $T_g$ less than or equal to $-10°$ C. and (ii) a rigid polymeric superstrate grafted to the elastomeric polymer substrate.

10. The flame retardant polycarbonate composition of claim 1, where the impact modifier is an acrylonitrile-butadiene-styrene, methyl methacrylate butadiene styrene, methacrylate-butadiene, acrylonitrile-styrene-butyl acrylate, methyl methacrylate-acrylonitrile-butadiene-styrene, acrylonitrile-ethylene-propylene-diene-styrene, or a combination thereof.

11. The flame retardant polycarbonate composition of claim 1, where the phosphazene compound has the structure:

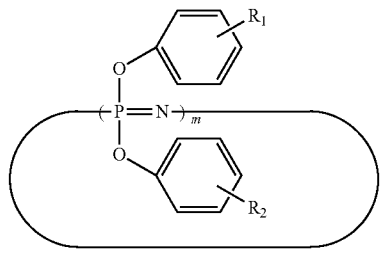

where in the formula (23), m represents an integer of 3 to 25, $R_1$ and $R_2$ are the same or different and are independently a hydrogen, a hydroxyl, a $C_{7-30}$ aryl group, a $C_{1-12}$ alkoxy, or a $C_{1-12}$ alkyl.

12. The flame retardant polycarbonate composition of claim 1, where the phosphazene compound is phenoxy cyclotriphosphazene, octaphenoxy cyclotetraphosphazene, decaphenoxy cyclopentaphosphazene, or a combination comprising at least one of the foregoing phosphazene compounds.

13. The flame retardant polycarbonate composition of claim 1, where the phosphazene compound has the structure:

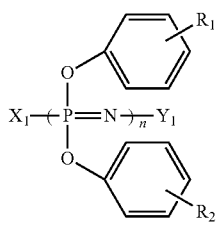

where in the formula (24), $X^1$ represents a $—N=P(OPh)_3$ group or a $—N=P(O)OPh$ group, $Y^1$ represents a $—P(OPh)_4$ group or a $—P(O) (OPh)_2$ group, Ph represents a phenyl group, n represents an integer from 3 to 10000, $R_1$ and $R_2$ are the same or different and are independently a hydrogen, a hydroxyl, a $C_{7-30}$ aryl, a $C_{1-12}$ alkoxy, or a $C_{1-12}$ alkyl.

14. The flame retardant polycarbonate composition of claim 1, where the phosphazene compound is a crosslinked phenoxyphosphazene.

15. The flame retardant polycarbonate composition of claim 1, where the phosphazene compound has a structure

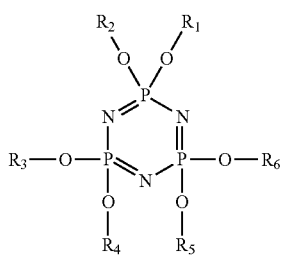

where $R_1$ to $R_6$ can be the same of different and can be an aryl group, an aralkyl group, a $C_{1-12}$ alkoxy, a $C_{1-12}$ alkyl, or a combination thereof.

16. The flame retardant polycarbonate composition of claim 1, where the phosphazene compound has a structure

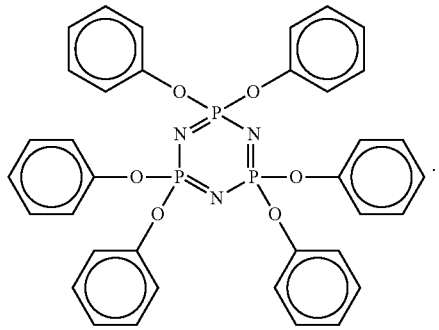

17. The flame retardant polycarbonate composition of claim 1, displaying a flame retardancy of V-0 at a sample thickness of at least 0.6 millimeters when tested per a UL-94 protocol.

18. The flame retardant polycarbonate composition of claim 1, displaying a flame retardancy of at least V-0 at a thickness of 0.6 millimeters when measured as per the UL-94 protocol and an impact strength of greater than or equal to 500 joules per meter, when tested as per ASTM D 256 at 23° C.

19. The flame retardant polycarbonate composition of claim 1, further comprising bisphenol A diphosphate and resorcinol diphosphate in amounts of 1 to 15 weight percent, based on the total weight of the flame retardant composition.

20. A method comprising:

blending 20 to 80 weight percent of a polycarbonate composition; where the polycarbonate composition comprises a polysiloxane-carbonate copolymer; an impact modifier in an amount of 0.5 to 25 weight percent; and 1 to 20 weight percent of a phosphazene compound to produce a flame retardant composition; where all weight percents are based on the total weight of the flame retardant composition; and extruding the flame retardant composition.

21. The method of claim 20, further comprising molding the composition.

22. An article manufactured from the composition of claim 1.

* * * * *